(12) United States Patent
Arai

(10) Patent No.: US 7,471,673 B2
(45) Date of Patent: Dec. 30, 2008

(54) IP TELEPHONE SYSTEM HAVING A HOLD FUNCTION AND A CALLBACK FUNCTION

(75) Inventor: Hideki Arai, Chiba (JP)

(73) Assignee: Oki Electric Industry Co., Ltd., Tokyo (JP)

(*) Notice: Subject to any disclaimer, the term of this patent is extended or adjusted under 35 U.S.C. 154(b) by 202 days.

(21) Appl. No.: 11/326,615

(22) Filed: Jan. 6, 2006

(65) Prior Publication Data

US 2006/0251231 A1 Nov. 9, 2006

(30) Foreign Application Priority Data

Jan. 7, 2005 (JP) ............................. 2005-002856

(51) Int. Cl.
*H04L 12/66* (2006.01)
(52) U.S. Cl. ........................................ 370/352; 379/45
(58) Field of Classification Search .................. 379/37, 379/45, 265.01, 221.03, 221.04; 370/352, 370/255, 355
See application file for complete search history.

(56) References Cited

U.S. PATENT DOCUMENTS

| | | | |
|---|---|---|---|
| 6,600,914 B2 * | 7/2003 | Uhlik et al. ............... | 455/404.1 |
| 6,741,696 B1 * | 5/2004 | Moriyama ............. | 379/265.01 |
| 7,212,521 B2 * | 5/2007 | Kwon ....................... | 370/352 |
| 7,289,486 B2 * | 10/2007 | Yeom ........................ | 370/352 |

FOREIGN PATENT DOCUMENTS

JP 2004363818 A * 12/2004

OTHER PUBLICATIONS

Draft report by the "Technical conditions related to the function of providing location information on callers sending emergency messages from cellular phones" May 2004, Committee for the Advancement of Emergency Message System, Information and Communications Technology Sub-Council, Information and Communications Council, Ministry of Internal Affairs and Communications.

Report by the "Study Group on IP Network Technology", Feb. 2002, Study Group on IP Network Technology, Ministry of Internal Affairs and Communications.

* cited by examiner

*Primary Examiner*—Fan Tsang
*Assistant Examiner*—Simon King
(74) *Attorney, Agent, or Firm*—Venable LLP; James R. Burdett

(57) ABSTRACT

An IP telephone system having a function for holding a call connection when a first IP telephone terminal disconnects a call connection and a function for calling back from a second IP telephone terminal to the first IP telephone terminal when the call connection is in a hold state. The IP telephone system of the present invention includes a holding device. When the first IP telephone terminal goes into an on-hook state, an IP telephone exchange which manages the first IP telephone terminal switches the call connection between the first and second IP telephone terminals to a call connection between the holding device and the second IP telephone terminal. In addition, when the second IP telephone terminal requests a callback, the IP telephone exchange switches the call connection between the holding device and the second IP telephone terminal to a call connection between the first and second IP telephone terminals.

20 Claims, 23 Drawing Sheets

FIG.24

| registered subscriber information |
|---|
| registered subscriber information |
| ⋮ |
| registered subscriber information (emergency communication terminal) |

| telephone number |
|---|
| IP address |
| connection state information |
| holding device specifying information |
| contracted additional service information |
| third party specifying information |

FIG.25

| subscriber information |
|---|
| subscriber information |
| ⋮ |
| subscriber information (emergency communication terminal) |

| telephone number |
|---|
| IP address |
| connection state information |
| holding device specifying information |
| exchange specifying information |
| contracted additional service information |
| third party specifying information |

IP TELEPHONE SYSTEM HAVING A HOLD FUNCTION AND A CALLBACK FUNCTION

BACKGROUND OF THE INVENTION

1. Field of the Invention

The present invention relates to an IP telephone system having a call holding function and a callback function. For example the present invention can be adapted to the IP telephone system which manages emergency calls, such as a call which reports occurrence of crime, accident, or fire disaster or a call which requests a help of emergency crews.

2. Description of Related Art

As a phone service, an emergency call service is known. An emergency call is a call which reports occurrence of crime, accident, or fire disaster or a call which requests a help of emergency crews. In order to deal with spread of mobile communication networks and IP telephone networks in resent years, a study of those networks to be adaptable to manage emergency calls is proceeded by the Japanese Ministry of Internal Affairs and Communications for example. As documents showing the study results of the Japanese Ministry of Internal Affairs and Communications, the following Documents 1 and 2 are known.

In the emergency call service, it is preferable that a call connection is remained until a receiver (that is, an emergency call center) disconnects the call connection even after a caller puts his or her telephone terminal in an on-hook state. This function is referred to as a hold function. The hold function is provided so that the emergency call center is able to call back the caller who puts the telephone terminal in an on-hook state certainly. A function for calling from the emergency call center to the caller in use of the holding call connection is referred to as a callback function. The hold function prevents the possibilities that the telephone network is congested or the line for callback is busy on another call from a third party. Accordingly, the callback function can certainly be implemented.

A method for realizing a hold function and a callback function of the emergency call service in use of the Public Switched Telephone Network is disclosed, for example, in the following Document 3. According to a method disclosed in the Document 3, a caller side telephone exchange determines whether the call is a normal call or an emergency call when receiving a calling signal. Then, when the call is an emergency call, the exchange keeps the call connection in a hold state without disconnecting even if the caller puts the telephone terminal in an on-hook state. Further, when the call connection is in the hold state, the exchange does not connect to the caller even when another call to the caller occurs.

Document 1: Draft report by the "Technical conditions related to the function of providing location information on callers sending emergency messages from cellular phones", May 2004, Committee for the Advancement of Emergency Message System, Information and Communications Technology Sub-Council, Information and Communications Council, Ministry of Internal Affairs and Communications Document 2: Report by the "Study Group on IP Network Technology", February 2002, Study Group on IP Network Technology, Ministry of Internal Affairs and Communications Document 3: Japanese Patent Laid-Open Publication No. 1999-103349

In the Public Switched Telephone Network, call connection is performed by physically allocating communication channels. Therefore, the hold function and the callback function can be realized with the method disclosed in Document 3.

On the other hand, the IP telephone system performs communications of digital audio data in use of communication packets. Therefore, physically allocated communication channels are not used in the IP telephone system. Accordingly, in a conventional IP telephone system, a call connection cannot be on hold.

In the Public Switched Telephone Network, a telephone set is fixed so that the telephone set is managed in a single exchange at any time. On the other hand, in the IP telephone system, a telephone set is movable so that the exchange which manages the telephone set may be changed. When the exchange which manages the telephone set is changed, the receiver side exchange cannot recognize the caller side exchange. Therefore, in the conventional IP telephone system, when an exchange connected to a telephone set is switched, receiver cannot perform call back.

SUMMARY OF THE INVENTION

An object of the present invention is to provide an IP telephone system having a hold function and a callback function.

An IP telephone system of the present invention comprises a first IP telephone exchange which manages a first IP telephone terminal; a second IP telephone exchange which manages a second IP telephone terminal; and a holding device which is call-connected with the second IP telephone terminal when the first IP telephone terminal holds a call connection with the second IP telephone terminal and call disconnected with the second IP telephone terminal when the call between the first and second terminals returned from hold state to connection state.

BRIEF DESCRIPTION OF THE DRAWINGS

Other objects and benefits of the present invention will be explained with reference to the following attached drawings.

FIG. 24 is a schematic diagram showing a data structure of a call processing database according to a fifth embodiment;

FIG. 25 is a schematic diagram showing a data structure of a subscriber information database according to the fifth embodiment.

DESCRIPTION OF THE PREFERRED EMBODIMENTS

Figure 1:
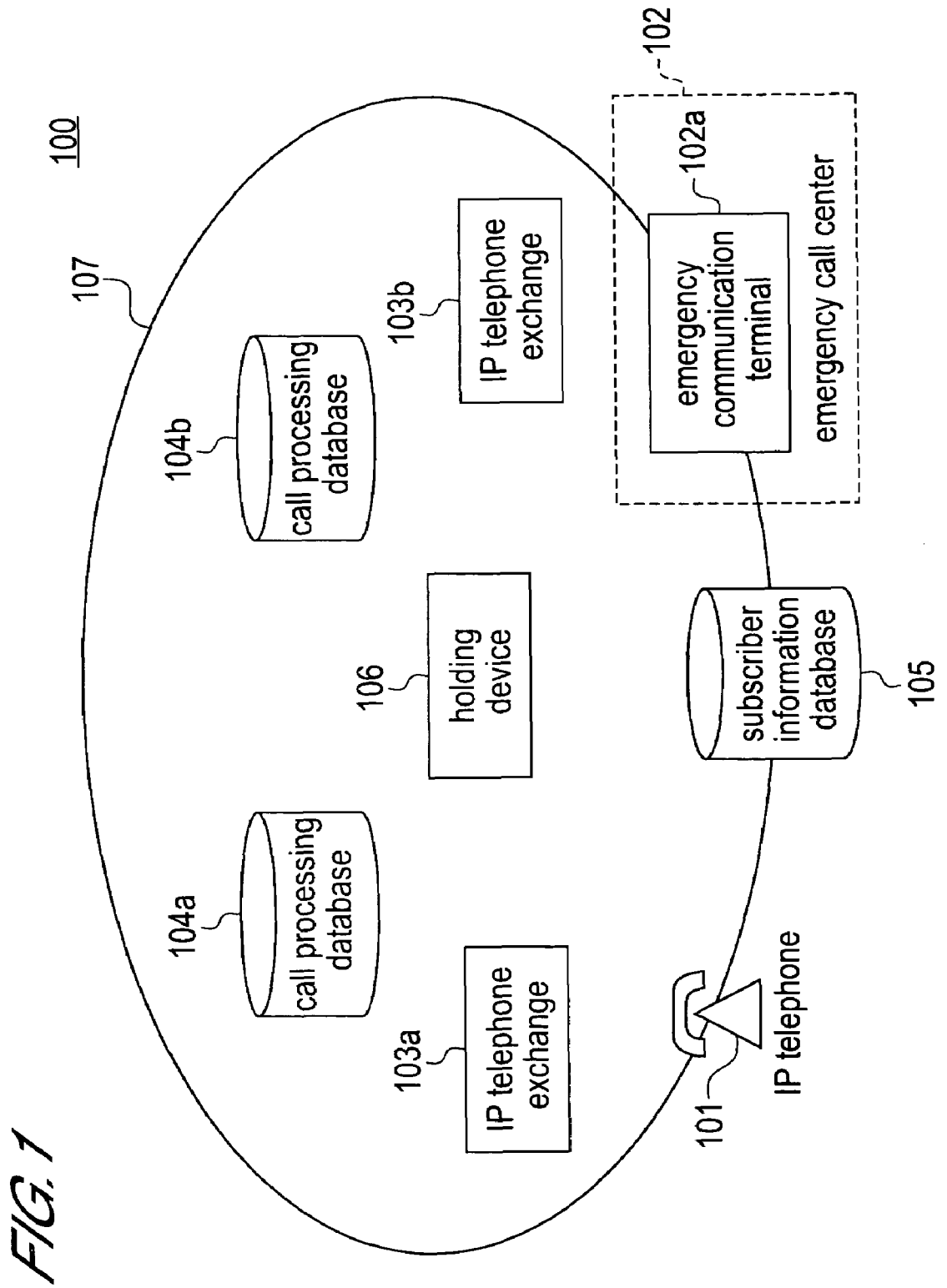
FIG. 1 is a schematic diagram showing a network structure of an IP telephone system according to a first embodiment.

Embodiments of the present invention will be explained below with reference to the drawings. In the drawings, sizes, shapes or placements of each element are schematically shown so as to make the invention understandable. Further, the numerical conditions explained below are only shown as examples.

First Embodiment

A first embodiment of the present invention will be explained with reference to FIGS. 1 to 9.

FIG. 1 is a schematic diagram showing a network structure of an IP telephone system 100 according to the first embodiment.

As described in FIG. 1, the IP telephone system 100 includes an IP telephone terminal 101, an emergency call center 102, IP telephone exchanges 103a and 103b, call processing databases 104a and 104b, a subscriber information database 105, a holding device 106 and a VoIP network 107.

The IP telephone terminal 101 is a telephone terminal for a subscriber to use the IP telephone services. The type of the IP telephone terminal is not limited in the present embodiment. The IP telephone terminal may be configured to be, for example, a normal telephone set connected to a terminal adapter for the IP telephone services, or a personal computer connected to a terminal adapter for the IP telephone services. In FIG. 1, the single IP telephone terminal 101 is explained; however, in usual, a number of IP telephone terminals are connected to the VoIP network 107.

The emergency call center 102 is a communication facility for receiving emergency calls. The emergency call center 102 is operated by, for example, administrative agencies such as the Emergency Communications Department. The emergency call center 102 has an emergency communication terminal 102a for receiving emergency calls from IP telephone terminals. Here, the emergency communication terminal 102a itself is not required to include IP telephone functions and the emergency communication terminal 102a adapted for Public Switched Telephone Network may be connected to the VoIP network 107 via a gateway. Commonly, the emergency call center 102 is capable of receiving calls from several telephone terminals including the IP telephone terminal 101 simultaneously, and one operator can have conversation with several callers simultaneously by switching the connections with the caller side telephone terminals. In addition, the emergency call center 102 has a hold function and a callback function.

The IP telephone exchanges 103a and 103b are used so that a telecommunication carrier can provide IP services to subscribers. One or more IP telephone exchanges may be provided; however, the present embodiment will be explained with an example in which a couple of IP telephone exchanges 103a and 103b so as to make the explanation simple. In addition, the IP telephone exchange 103a manages the IP telephone terminal 101 and the IP telephone exchange 103b manages the emergency communication terminal 102a.

The call processing databases 104a and 104b store data of the IP telephone terminals registered in the relevant IP telephone exchanges 103a and 103b. The call processing databases 104a and 104b, preferably, are composed in use of nonvolatile storage (that is, storage in which data will not lost by rebooting or turning the power off). The structure of data stored in the call processing databases 104a and 104b will be explained below with reference to FIG. 2. According to the present embodiment, each of the IP telephone exchanges 103a and 103b has a single call processing database. The call processing databases 104a and 104b may be built into the relevant IP telephone exchanges or may be connected to the network in use of dedicated cables.

The subscriber information database 105 stores data of all subscribers to whom the IP telephone service of the relevant telecommunication carrier is provided. The subscriber information database 105, preferably, is composed in use of non-volatile storages. A structure of data stored in the subscriber information database 105 will be explained below with reference to FIG. 3. The subscriber information database 105 is shared by a plurality of IP telephone exchanges 103 which belong to the same telecommunication carrier (that is, several IP telephone exchanges 103 connected to the same VoIP network 107). Here, the number of the subscriber information database 105 is not required to be one, and several distributed storages may constitute a single database.

The holding device 106 is used for holding an emergency call connection that is a call connection between the IP telephone terminal 101 and the emergency call center 102. As described below, when the IP telephone terminal 101 goes into an on-hook state in emergencies, the call connection is switched to a call connection between the emergency call center 102 and the holding device 106. Therefore, the holding device 106 has a function for the IP telephone call processing. One or more holding devices 106 may be provided to a single VoIP network 107. For example, in the case of Japan in which an emergency call center in police and an emergency call center for calling out an emergency vehicle (an ambulance or a fire engine) are operated separately, holding devices may be provided to each emergency call center or those emergency call centers may share a single holding device 106.

The VoIP network 107 is a network for performing a call connection between the IP telephone terminal 101 and the emergency call center 102 and a call connection between IP telephone terminals in use of the Voice over Internet Protocol (VoIP).

Figure 2:
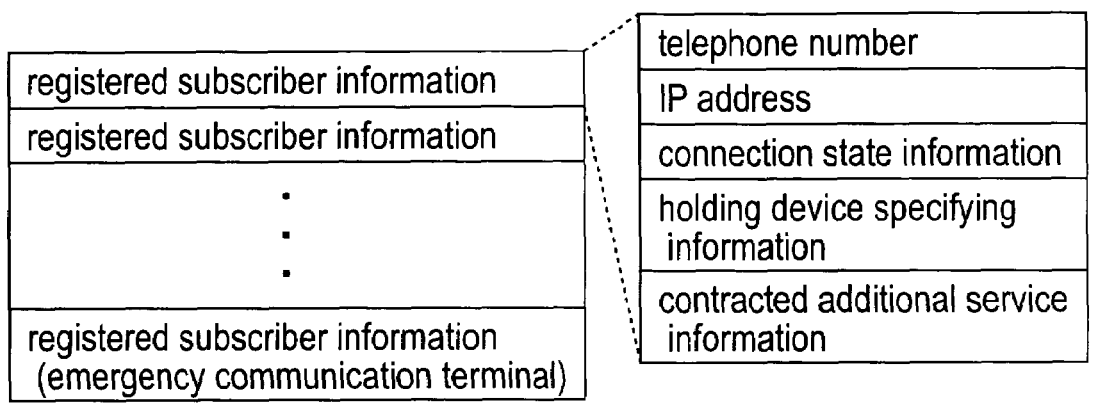
FIG. 2 is a schematic diagram showing a data structure of a call processing database according to the first embodiment.

FIG. 2 is a schematic diagram showing a structure of data stored in the call processing databases 104a and 104b.

As shown in FIG. 2, the call processing databases 104a and 104b store a telephone number, an IP address, a connection state information, a holding devices specifying information, and a contracted additional service information as each of registered subscriber information.

Here, the telephone number and the IP address are information for specifying a subscriber and his or her IP telephone terminal.

The connection state information is information for identifying whether or not an emergency call is being implemented.

The holding device specifying information is information for specifying a holding device which holds a call connection of concerned subscriber.

The contracted additional service information is information showing additional services which a subscriber contracts, for example, call transferring service, service for accepting outgoings only, service for not notifying telephone number.

The registered subscriber information stored in the call processing databases 104a, 104b includes subscriber information of the emergency communication terminal 102a. The call processing databases 104a and 104b are preferably configured so that only limited controllers are allowed to rewrite the subscriber information of the emergency communication terminal 102a.

Figure 3:
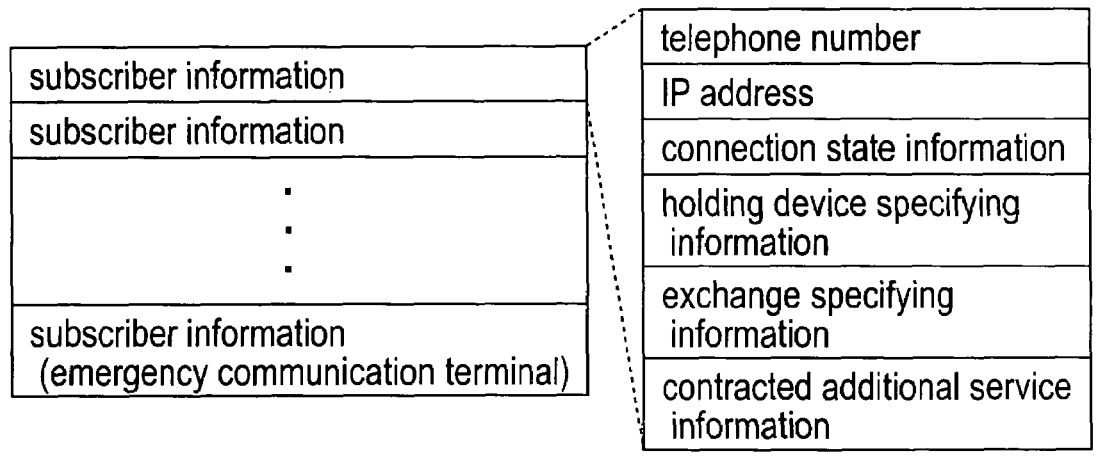
FIG. 3 is a schematic diagram showing a data structure of a subscriber information database according to the first embodiment.

FIG. 3 is a schematic diagram showing a structure of data stored in the subscriber information database 105.

As shown in FIG. 3, the subscriber information database 105 stores a telephone number, an IP address, a connection state information, a holding device specifying information, an exchange specifying information and a contracted additional service information as each of subscriber information.

The telephone number, the IP address, the connection state information, the holding device specifying information and the contracted additional service information are the same as information stored in the call processing databases 104a and 104b.

The exchange specifying information is information for specifying the IP telephone exchanges 103a and 103b to which the subscriber's IP telephone terminal is registered.

The subscriber information stored in the subscriber information database 105 includes subscriber information of the emergency communication terminal 102a. The subscriber information database 105 is preferably configured so that only limited controllers are allowed to rewrite the subscriber information of the emergency communication terminal 102a.

Subsequently, a function of the IP telephone system 100 according to the present embodiment will be explained.

The IP telephone system 100 has a registration function, an emergency call function, a hold function, an call block function, a callback function, and a connection recovery function. These functions will be explained below.

The registration function is a function for registering the subscriber's IP telephone terminal 101 and the emergency communication terminal 102a to either one of the IP telephone exchanges 103a and 103b. The information relating to the registered IP telephone terminal is stored in the corresponding call processing database. With an implementation of the registration function, terminals 101 and 102a are managed in any one of the IP telephone exchanges. As the terminals 101 is managed in an IP telephone exchange, the IP telephone terminal 101 can perform call connection to another terminal via the VoIP telephone network 107. In use of the registration function, the subscriber can freely make his or her IP telephone terminal 101 be managed in one of the IP telephone exchanges. Further, when the IP telephone terminal 101 moves, the IP telephone exchange which manages the IP telephone terminal 101 can be changed to another IP telephone exchange. However, when the change of the IP telephone exchange which manages the IP telephone terminal 101 is allowed, the hold function and the callback function cannot be performed by using the technique in the Public Switched Telephone Network. This is because, when the IP telephone terminal 101 in a hold state moves, the IP telephone exchange 103b which manages the emergency communication terminal 102a cannot recognize the IP telephone exchange which manages the moved IP telephone terminal 101. In the present embodiment, the hold function and the callback function will be realized in the following explanation.

The emergency call function is a function for performing call connection between the IP telephone terminal 101 of the subscriber and the emergency communication terminal 102a of the emergency call center 102. The IP telephone exchange 103a which manages the IP telephone terminal 101 allows the hold function, the callback function or other functions, those are explained below, only for emergency calls.

The hold function is a function for remaining the call connection after the IP telephone terminal 101 goes into the on-hook state, until the call connection is released by the emergency communication terminal 102a. As described below, when the IP telephone terminal 101 goes into the on-hook state, the IP telephone exchange 103a switches the call connection between the IP telephone terminal 101 and the emergency communication terminal 102a to a call connection between the holding device 106 and the emergency communication terminal 102a. As described below, information regarding call connection in a hold state is stored in the call processing database 104a and the subscriber information database 105.

The callback function is a function for calling to the caller from the emergency communication terminal 102a in use of the call connection in a hold state. When callback request is received from the emergency communication terminal 102a, the IP telephone exchange 103a reads information regarding call connection in a hold state from the subscriber information database 105 and, in use of this information, the IP telephone exchange 103a brings the call connection between the holding device 106 and the emergency communication terminal 102a back to the call connection between the IP telephone terminal 101 and the emergency communication terminal 102a.

The call block function is a function for blocking a calling signal to the IP telephone terminal 101 from a telephone terminal of a third party when the call connection between the IP telephone terminal 101 and the emergency communication terminal 102a is in a hold state, that is, when the call connection is switched to a call connection between the holding device 106 and the emergency communication terminal 102a. When a call request is performed to the IP telephone terminal 101 from the telephone terminal of the third party under a hold state, the IP telephone exchange 103a returns a busy signal to the telephone terminal of the third party. The call block function prevents a situation that the emergency call center cannot call back the IP telephone terminal 101 as the third party performs a call request, or is call connected, to the IP telephone terminal 101.

The connection recovery function is a function that the IP telephone exchange recovers the emergency call in a hold state when the IP telephone terminal 101 tries to perform a call request in a condition that the emergency call is in a hold state. When the IP telephone exchange receives a calling signal from the IP telephone terminal 101, the IP telephone exchange brings the call connection between the holding device 106 and the emergency communication terminal 102a back to a call connection between the IP telephone terminal 101 and the emergency communication terminal 102a regardless of the called telephone number included in the calling signal.

Next, operations for realizing the registration function, the emergency call function, the hold function, the callback function, the call block function, and the connection recovery function are explained in detail with reference to FIGS. 4 to 9.

Figure 4:
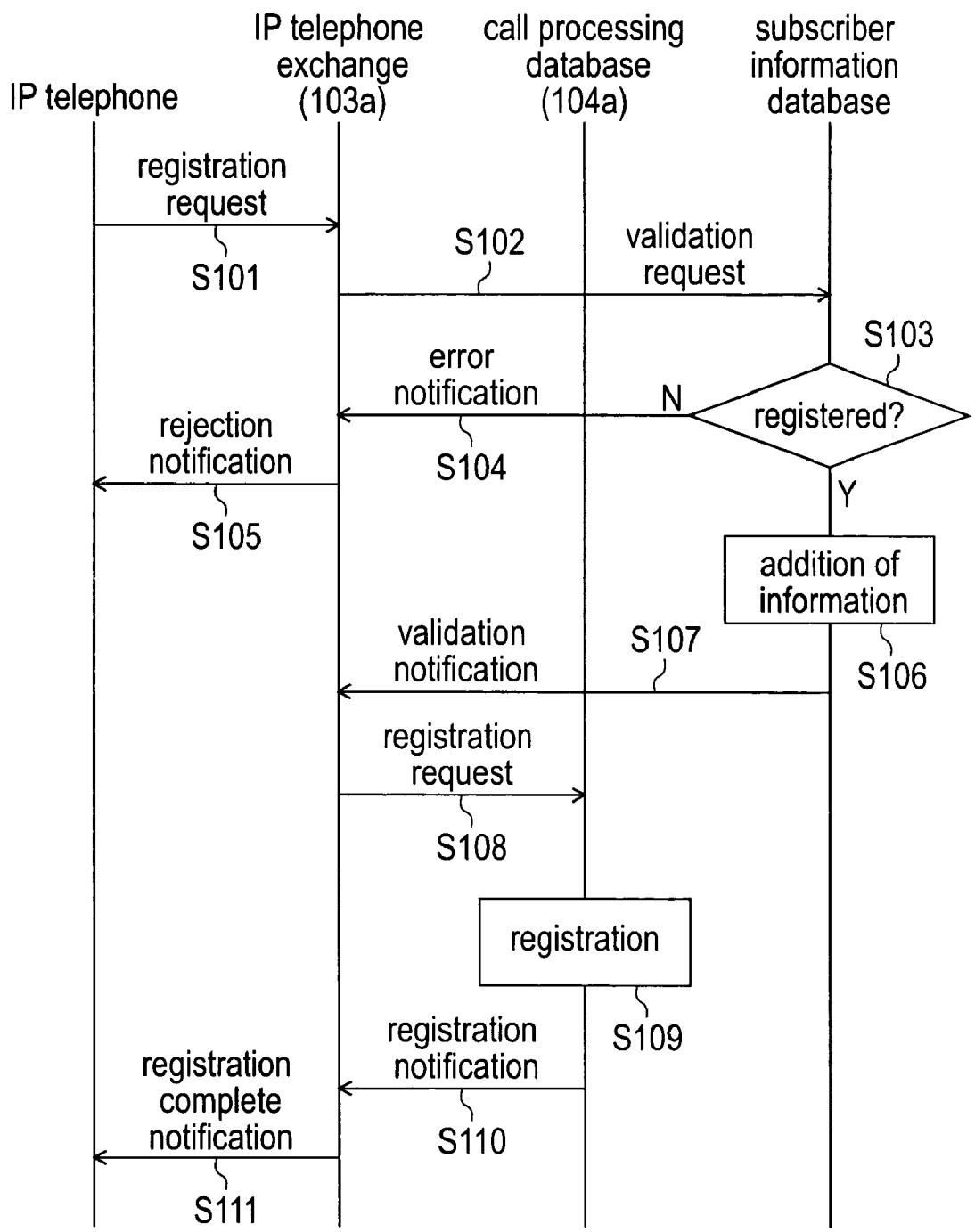
FIGS. 4 to 9 are schematic diagrams showing sequences of operations of the IP telephone system according to the first embodiment.

FIG. 4 is a schematic diagram showing sequence of an operation regarding the registration function.

The IP telephone terminal 101 internally stores a telephone number and an IP address which are allocated to the terminal itself. When the IP telephone terminal 101 is connected to the IP telephone exchange 103a via a communication cable and is turned on, the IP telephone terminal 101 automatically transmits a registration request (See step S101 in FIG. 4). In the registration request, the telephone number and the IP address of the IP telephone terminal 101 is included. As a transmission protocol of the registration request, the IP telephone terminal 101 may be use a Session Initiation Protocol (SIP), for example. In the present embodiment, as the IP telephone terminal 101 is connected to the IP telephone exchange 103*a* via the communication cable, the registration request is received by the IP telephone exchange 103*a*.

The IP telephone exchange 103*a* transmits a validation request to the subscriber information database 105 for validating that the registration request is transmitted from the subscriber (See step S102 in FIG. 4). In the validation request, an exchange specifying information regarding the IP telephone exchange 103*a* is included in addition to the telephone number and the IP address of the IP telephone terminal 101.

The subscriber information database 105 searches a subscriber information corresponding to the telephone number of the IP telephone terminal 101 (See step S103 in FIG. 4, and FIG. 3).

When subscriber information corresponding to the telephone number of the IP telephone terminal 101 is not stored, the subscriber information database 105 determines that the subscriber is not registered and transmits an error notification (See step S104 in FIG. 4). When the IP telephone exchange 103*a* receives the error notification, the IP telephone exchange 103*a* transmits a notification notifying a rejection of registration to the IP telephone terminal 101 (See step S105 in FIG. 4).

On the other hand, when subscriber information corresponding to the telephone number of the IP telephone terminal 101 is stored, the subscriber information database 105 writes the telephone number, the IP address, and the exchange specifying information included in the validation request into the subscriber information (See step S106 in FIG. 4). The subscriber information database 105 takes the connection state information, the holding device specifying information and the contracted additional service information from the subscriber information. Then, the subscriber information database 105 transmits a validation notification including these information (See step S107 in FIG. 4). Here, when the connection state information and the holding device specifying information are blank, those information may be not included in the validation notification.

When the IP telephone exchange 103*a* receives the validation notification, the IP telephone exchange 103*a* transmits a registration request to the call processing database 104*a* (See step S108 in FIG. 4). In the registration request, the telephone number, the IP address, the connection state information, the holding device specifying information and the contracted additional service information of the IP telephone terminal 101 are included. Here, when the connection state information and the holding device specifying information are blank, the information may be not included in the validation notification.

When the call processing database 104*a* receives the registration request, the call processing database 104*a* creates registered subscriber information including the telephone number, the IP address and the contracted additional service information of the IP telephone terminal 101 (See step S109 in FIG. 4, and FIG. 2). When the connection state information and the holding device specifying information are blank or are not included, the call processing database 104*a* may keep those information blank. When the registration is completed, the call processing database 104*a* transmits a registration complete notification (See step S110 in FIG. 4).

When the IP telephone exchange 103*a* receives the registration complete notification, the IP telephone exchange 103*a* transmits the registration complete notification to the IP telephone terminal 101 (See step S111 in FIG. 4).

When the registration complete notification is received by the IP telephone terminal 101, registration process is finished.

Figure 5:
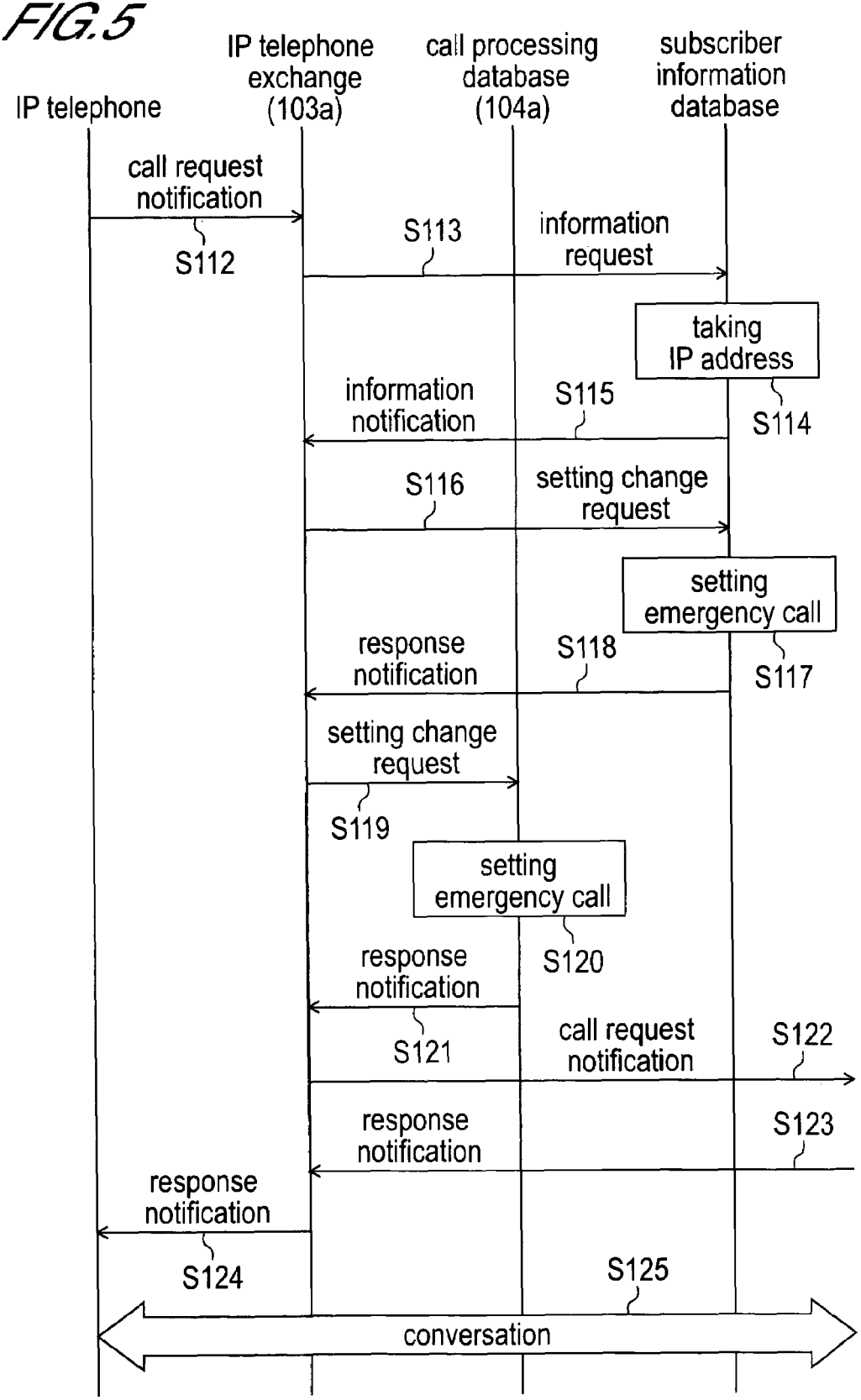

FIG. 5 is a schematic diagram showing sequence of an operation regarding the emergency call function.

After the above registration is completed, the IP telephone terminal 101 can implement an emergency call.

When a subscriber or the like dials the telephone number of the emergency call (here the telephone number of the emergency communication terminal 102*a*), the IP telephone terminal 101 transmits a call request notification (See step S112 in FIG. 5). In the call request notification, the telephone numbers of the IP telephone terminal 101 and the emergency communication terminal 102*a* are included. As a transmission protocol of the call request notification, for example, the above described SIP may be used.

When the IP telephone exchange 103*a* receives the call request notification, the IP telephone exchange 103*a* transmits an information request (See step S113 in FIG. 5). The information request is a notification for requesting subscriber information corresponding to the called telephone number (that is, the telephone number of the emergency communication terminal 102*a*) to the subscriber information database 105.

The subscriber information database 105 takes the called telephone number from the information request and searches subscriber information corresponding to the telephone number. Then, the subscriber information database 105 takes an IP address from the subscriber information (See step S114 in FIG. 5). In the IP telephone system, the telephone number allocated to the emergency communication terminal 102*a* may be different from the telephone number of the emergency call (for example, "911"). In such case, when the subscriber dials the number of the emergency call, the number of the emergency call is converted to the telephone number allocated to the emergency communication terminal 102*a* inside the IP telephone system. When such conversion is performed, the search may be implemented in use of the converted telephone number.

The subscriber information database 105 transmits an information notification to the IP telephone exchange 103*a* (See step S115 in FIG. 5). In the information notification, the IP address allocated to the called telephone number is included.

When receiving the information notification, the IP telephone exchange 103*a* transmits a setting change request to the subscriber information database 105 (See step S116 in FIG. 5). When receiving the setting change request, the subscriber information database 105 changes the connection state information of the subscriber information corresponding to the called telephone number to "emergency call" (See step S117 in FIG. 5, and FIG. 3). Then, the subscriber information database 105 transmits a response notification to the IP telephone exchange 103*a* (See step S118 in FIG. 5).

The IP telephone exchange 103*a* transmits a setting change request to the call processing database 104*a* (See step S119 in FIG. 5). When receiving the setting change request, the call processing database 104*a* changes the connection state information of the registered subscriber corresponding to the called telephone number to "emergency call" (See step S120 in FIG. 5). Then, the call processing database 104*a* transmits a response notification to the IP telephone exchange 103*a* (See step S121 in FIG. 5).

The steps S119 to S121 may be performed earlier than the steps S116 to S118.

The IP telephone exchange 103a transmits a call request notification to the IP telephone exchange 103b (See step S122 in FIG. 5). The IP telephone exchange 103b transmits the call request notification to the emergency communication terminal 102a. When receiving the call request notification, the emergency communication terminal 102a transmits a response notification to the IP telephone exchange 103b. The IP telephone exchange 103b transmits the response notification to the IP telephone exchange 103a (See step S123 in FIG. 5). The IP telephone exchange 103a transmits the response notification to the IP telephone terminal 101 (See step S124 in FIG. 5). In this way, a call connection is established between the IP telephone terminal 101 and the emergency communication terminal 102a and conversation between the IP telephone terminal 101 and the emergency communication terminal 102a can be performed (See step S125 in FIG. 5).

The IP telephone exchange 103b may or may not request the call processing database 104b to set the connection state information in the registered subscriber information of the emergency communication terminal 102a to "emergency call". The matter which method is used may be determined according to the system design. When the setting of the connection state information in the registered subscriber information of the emergency communication terminal 102a is changed to "emergency call", procedures which are same as steps S119 to 121 can be used.

In all resources performing transmissions and relays of audio packets relays in the IP telephone system 100, a flag or a field indicating a priority level of the voice packet regarding an emergency call is preferably set in the highest level.

Figure 6:
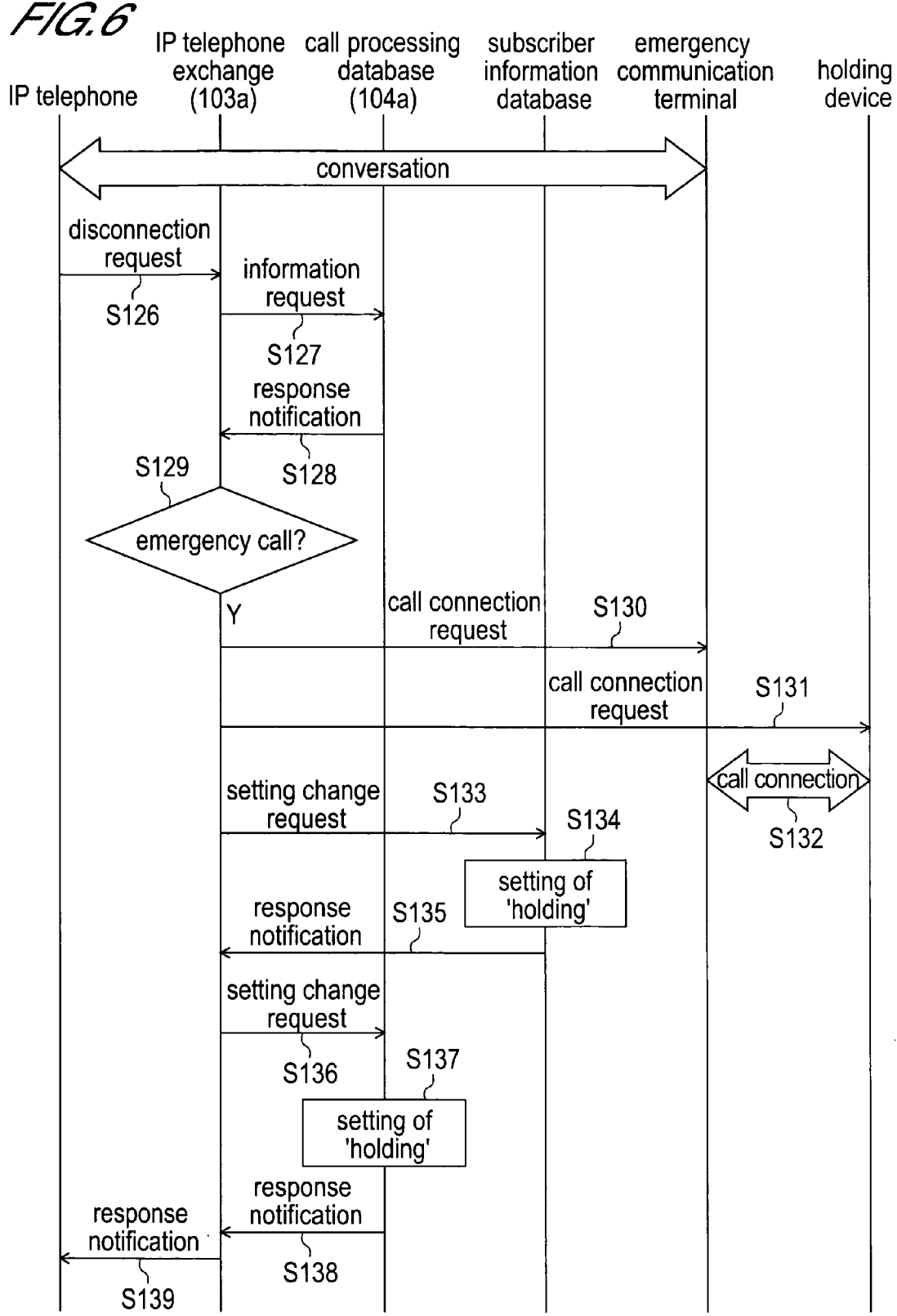

FIG. 6 is a schematic diagram showing sequence of an operation regarding the hold function.

As described above, a caller puts the IP telephone terminal 101 in and on-hook state during an emergency call, the call connection becomes in a hold state.

When the IP telephone terminal 101 goes into the on-hook state, a disconnection request (that is, a notification for requesting a disconnection of the call) is transmitted to the IP telephone exchange 103a from the IP telephone terminal 101 (See step S126 in FIG. 6). As a protocol for this request, for example, the above described SIP may be used.

When receiving the disconnect information request, the IP telephone exchange 103a transmits an information request to the call processing database 104a (See step S127 in FIG. 6). The information request is a notification for requesting connection state information corresponding to the IP telephone terminal 101. The information request includes the telephone number of the IP telephone terminal 101.

When receiving the information request, the call processing database 104a takes connection state information from the registered subscriber information corresponding to the telephone number. Then the call processing database 104a transmits a response notification including the connection state information to the IP telephone exchange 103a (See step S128 in FIG. 6).

The IP telephone exchange 103a takes the connection state information from the received response notification (See step S129 in FIG. 6). When the connection state information is not "emergency call", a normal disconnection process is performed. The disconnection process in this case is the same as a disconnection process of the normal IP telephone system, so the explanation is not repeated here. On the other hand, when the connection state information is "emergency call", a call connection holding process is performed as described below.

Firstly, the IP telephone exchange 103a requests the emergency communication terminal 102a and the holding device 106 for a call connection (See steps S130 and S131 in FIG. 6).

Accordingly, the call connection between the emergency communication terminal 102a and the holding device 106 is established (See step S132 in FIG. 6). This procedure for the call connection is the same as that of a normal call connection in the IP telephone system except for setting the registered subscriber information and the subscriber information back to a previous setting (See FIGS. 2 and 3), so the explanation is omitted here.

Subsequently, the IP telephone exchange 103a transmits a setting change request to the subscriber information database 105 (See step S133 in FIG. 6). When receiving the setting change request, the subscriber information database 105 sets 'the connection state information' in the subscriber information corresponding to the IP telephone terminal 101 to "holding", and writes information specifying the holding device 106 into 'the holding device specifying information' of the subscriber information (See step S134 in FIG. 6). Then, the subscriber information database 105 transmits a response notification to the IP telephone exchange 103a (See step S135 in FIG. 6).

Next, the IP telephone exchange 103a transmits the setting change request to the call processing database 104a (See step S136 in FIG. 6). When receiving the setting change request, the call processing database 104a sets 'the connection state information' in the registered subscriber information corresponding to the IP telephone terminal 101 to "holding", and writes information specifying the holding device 106 into 'the holding device specifying information' in the registered subscriber information (See FIG. 2 and step S137 in FIG. 6). Then, the call processing database 104a transmits the response notification to the IP telephone exchange 103a (See step S138 in FIG. 6).

The steps S136 to S138 may be performed earlier than the steps S133 to S135.

The IP telephone exchange 103a transmits the response notification to the IP telephone terminal 101. In this way, the IP telephone terminal 101 is set in the hold state (See step S139 in FIG. 6).

The IP telephone exchange 103b may or may not perform the setting of the connection state information in the registered subscriber information of the emergency communication terminal 102a to "holding". The matter which method is used may be determined according to the system design. When the connection state information in the registered subscriber information of the emergency communication terminal 102a is set to "holding", the same procedure shown as the steps S136 to S139 may be used.

The procedure that the communication terminal 102a disconnects the call is same as that of a call disconnection of a normal IP telephone system except for setting the registered subscriber information and the subscriber information back to a previous setting (See FIGS. 2 and 3). Here, when the communication terminal 102a disconnects the call, holding of the call connection is not performed. Thus, the call block function, the callback function, and the connection recovery function, which will be explained below, cannot be used.

Figure 7:
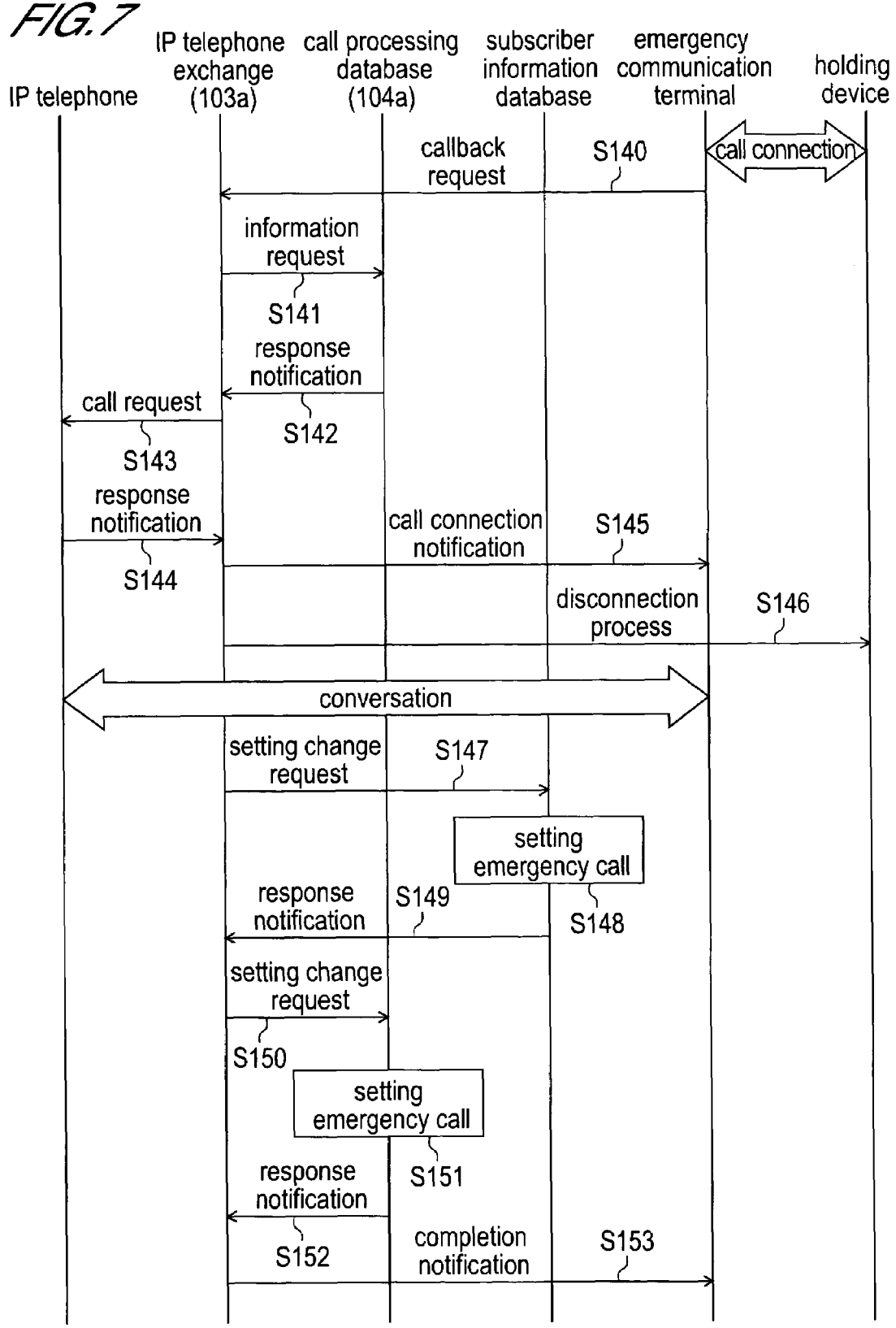

FIG. 7 is a schematic diagram showing sequence of an operation regarding the callback function.

As described above, with the callback function, the call connection in the hold state can be switched to a call connection between the emergency communication terminal 102a and IP telephone terminal 101 promptly and certainly.

An operator operates the emergency communication terminal 102a to transmit a callback request. The callback request includes the telephone number of the IP telephone terminal 110. The callback request is received by the IP telephone exchange 103a via the IP telephone exchange 103b (See step S140 in FIG. 7).

When receiving the callback request, the IP telephone exchange 103a transmits an information request to the call processing database 104a (See step S141 in FIG. 7). In the information request, the telephone number of the IP telephone terminal 101 is included.

When receiving the information request, the call processing database 104a takes the connection state information and the holding device specifying information from the registered subscriber information corresponding to the telephone number of the IP telephone terminal 101. When it is in a hold state, the connection state information indicates "holding". The call processing database 104a transmits a response notification including the connection state information and the holding device specifying information to the IP telephone exchange 103a (See step S142 in FIG. 7).

The IP telephone exchange 103a checks the received response notification. When the connection state information is in a hold state, the IP telephone exchange 103a transmits a call request notification to the IP telephone terminal 101 (See step S143 in FIG. 7). The IP telephone terminal 101 transmits to a response notification corresponding to the call request notification to the IP telephone exchange 103a (See step S144 in FIG. 7).

When receiving the response notification, the IP telephone exchange 103a notifies the emergency communication terminal 102a that a call connection with the IP telephone terminal 101 will be established (See step S145 in FIG. 7). At all most the same time, the IP telephone exchange 103a provides the holding device with a process to disconnect the call connection with the emergency communication terminal 102a (See step S146 in FIG. 7).

In this way, conversation between the emergency communication terminal 102a and the IP telephone terminal 101 is realized. The system 100 according to the present embodiment includes the holding device 106 so that a call connection between the emergency communication terminal 102a and the IP telephone exchange 103a can be maintained in the case of a hold state. Thus, in the system 100, when recovering a call connection to an emergency call state from a hold state, it is required only to establish a call connection between the IP telephone exchange 103a and the IP telephone terminal 101. Therefore, according to the present embodiment, a callback can be performed promptly and certainly.

The IP telephone exchange 103a transmits a setting change request to the subscriber information database 105 (See step S147 in FIG. 7). When receiving the setting change request, the subscriber information database 105 sets the connection state information of the subscriber information corresponding to the IP telephone terminal 101 to "emergency call" (See step S148 in FIG. 7). The subscriber information database 105 deletes the holding device specifying information here. Then, the subscriber information database 105 transmits a response notification to the IP telephone exchange 103a (See step S149 in FIG. 7).

The IP telephone exchange 103a transmits a setting change request to the call processing database 104a (See step S150 in FIG. 7). When receiving the setting change request, the call processing database 104a sets the connection state information of the registered subscriber information corresponding to the IP telephone terminal 101 to "emergency call" (See step S151 in FIG. 7). Here, the call processing database 104a deletes the holding device specifying information. Then, the call processing database 104a transmits a response notification to the IP telephone exchange 103a (See step S152 in FIG. 7).

The steps S150 to 152 may be performed earlier than the steps S147 to 149.

Finally, the completion of the callback process is notified to the emergency communication terminal 102a (See step S153 in FIG. 7).

Figure 8:
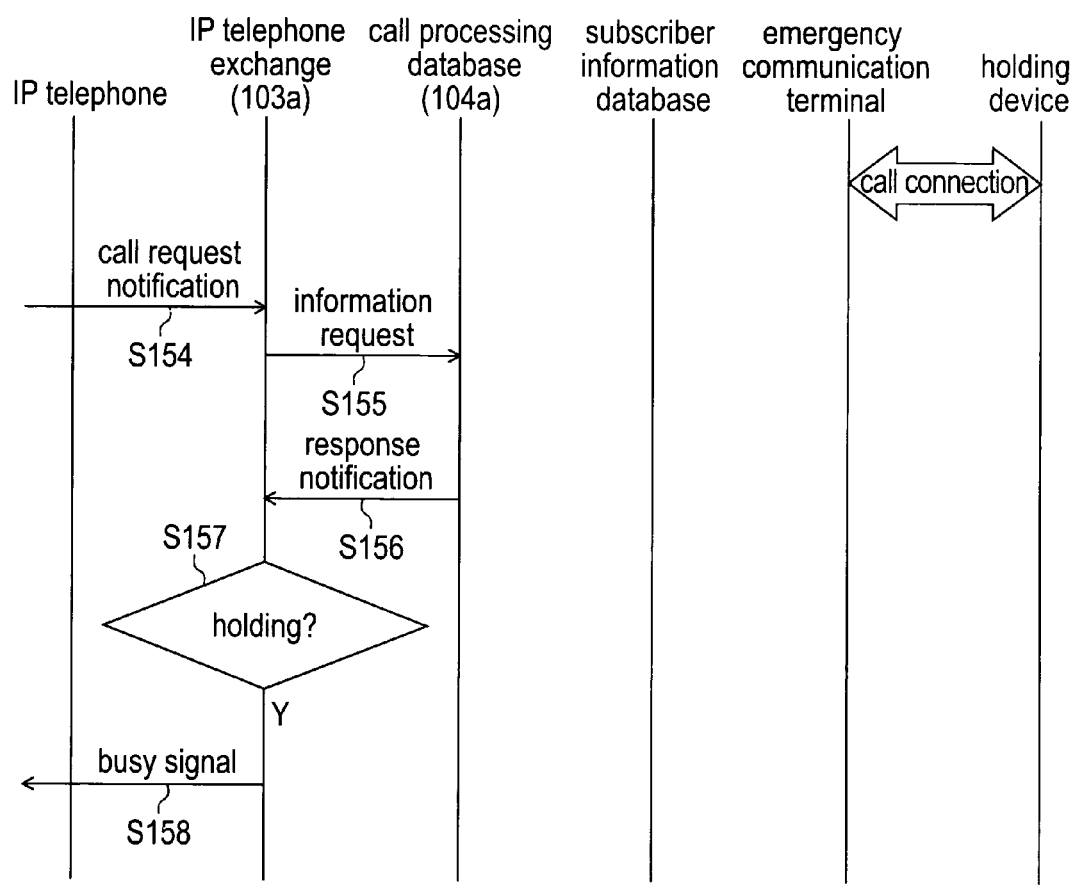

FIG. 8 is a schematic diagram showing sequence of an operation regarding the call block function.

As described above, when there is a call request for the IP telephone terminal 101 which is in a hold state, the call is blocked and a busy signal is transmitted to the calling telephone terminal.

When receiving a call request notification from a telephone terminal or another IP telephone exchange 103b (See step S154 in FIG. 8), the IP telephone exchange 103a transmits an information request to the call processing database 104a (See step S155 in FIG. 8). In the information request, the called telephone number (here, the telephone number of the IP telephone terminal 101) is included.

When receiving the information request, the call processing database 104a takes the connection state information from the registered subscriber information corresponding to the telephone number. Then, the call processing database 104a transmits a response notification including the connection state information to the IP telephone exchange 103a (See step S156 in FIG. 8).

The IP telephone exchange 103a takes the connection state information from the received response notification (See step S157 in FIG. 8). When the connection state information is not "holding", a normal incoming call process is performed. The process in such case is the same as a call process in a normal incoming IP telephone system, so the explanation is omitted here. On the other hand, when the taken connection state information is "holding", the IP telephone exchange 103a transmits a busy signal to the calling telephone set and notifies that the call is rejected (See step S158 in FIG. 8).

Figure 9:
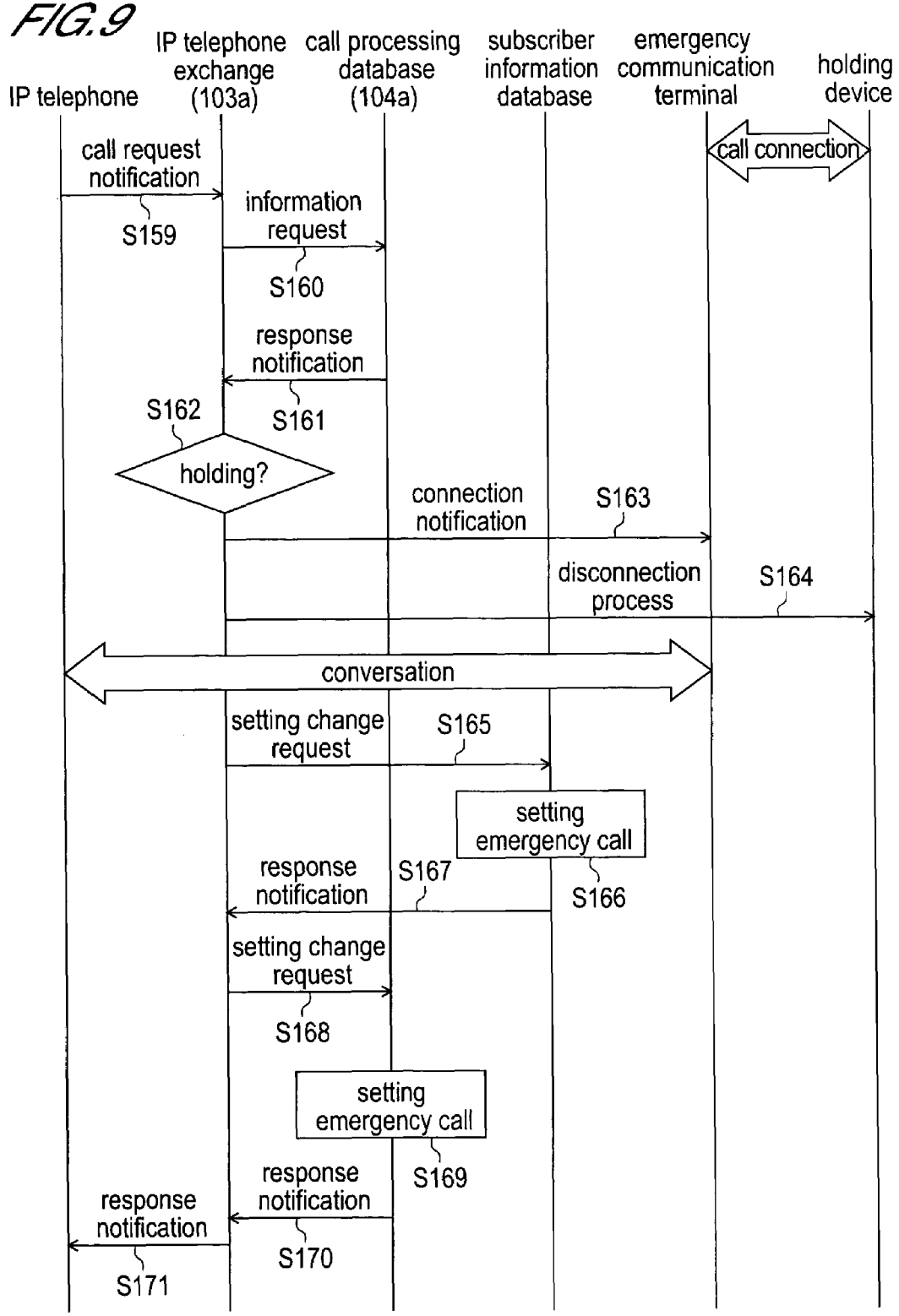

FIG. 9 is a schematic diagram showing sequence of an operation regarding the connection recovery function.

As described above, when the IP telephone terminal 101 tries to perform a call request in a condition that the emergency call is in a hold state, the IP telephone exchange recovers the emergency call in a hold state regardless whether or not the dialed number is the telephone number of the emergency call.

When the subscriber dials a telephone number, the IP telephone terminal 101 transmits a call request notification (See step S159 in FIG. 9). In the call request notification, the telephone number of the IP telephone terminal 101 and the called telephone number are included. As a transmission protocol for the call request notification, the above described SIP may be used, for example.

When receiving the call request notification, the IP telephone exchange 103a transmits an information request to the call processing database 104a (See step S160 in FIG. 9).

When receiving the call request notification, the call processing database 104a takes the connection state information and the holding device specifying information from the registered subscriber information corresponding to the telephone number of the IP telephone terminal 101. When a call connection is in a hold state, the connection state information indicates "holding". The call processing database 104a transmits a response notification including the connection state information and the holding device specifying information to the IP telephone exchange 103a (See step S161 in FIG. 9).

The IP telephone exchange 103a checks the received response notification (See step S162 in FIG. 9). When the connection state information is "holding", the IP telephone exchange 103a notifies to the emergency communication terminal 102a that a call connection with the IP telephone terminal 101 will be established (See step S163 in FIG. 9). At all most the same time, the IP telephone exchange 103a provides the holding device with a process for disconnecting the call connection with the emergency communication terminal 102a (See step S164 in FIG. 9).

Accordingly, conversation between the emergency communication terminal 102a and the IP telephone terminal 101 is realized.

The IP telephone exchange 103a transmits a setting change request to the subscriber information database 105 (See step S165 in FIG. 9). When receiving the setting change request, the subscriber information database 105 sets the connection state information of the subscriber information corresponding to the IP telephone terminal 101 to "emergency call" (See step S166 in FIG. 9). The subscriber information database 105 of the present embodiment deletes the holding device specifying information here. Then, the subscriber information database 105 transmits a response notification to the IP telephone exchange 103a (See step S167 in FIG. 9).

The IP telephone exchange 103a transmits a setting change request to the call processing database 104a (See step S168 in FIG. 9). When receiving the setting change request, the call processing database 104a sets the connection state information of the registered subscriber information corresponding to the IP telephone terminal 101 to "emergency call" (See step S169 in FIG. 9). Here, the call processing database 104a of the present embodiment deletes the holding device specifying information. Then, the call processing database 104a transmits a response notification to the IP telephone exchange 103a (See step S170 in FIG. 9).

The steps S168 to S170 may be performed earlier than the steps S165 to S167.

The IP telephone exchange 103a transmits the response notification to the IP telephone terminal 101 (See step S171 in FIG. 9). Accordingly, the connection recovery process is completed.

The IP telephone exchange 103b may or may not request to the call processing database 104b to set the connection state information in the registered subscriber information of the emergency communication terminal 102a to "emergency call". The matter which method is used may be determined according to the system design.

In some cases, a subscriber of the IP telephone service contracts an additional service. A calling and called processing in non-emergency situations are performed in accordance with the registered additional services. However, an emergency call, holding, callback, call block, and connection recovery described above are performed regardless the registered additional services. For example, the callback request will not be transferred even when the subscriber is contracted to the call forwarding service.

As described above, the system 100 according to the present embodiment performs holding of an emergency call by establishing a call connection between the emergency communication terminal 102a and the holding device. Accordingly, in the IP telephone system, a hold function same as that in the Public Switched Telephone Network can be realized.

Second Embodiment

A second embodiment of the present invention will be explained with reference to FIGS. 10 to 13.

A system structure and functions of an IP telephone system according to the present embodiment are the same as those of the system according to the first embodiment. The present embodiment differs from the first embodiment on the point that the holding device which is used is determined when an emergency call is connected.

Figure 10:
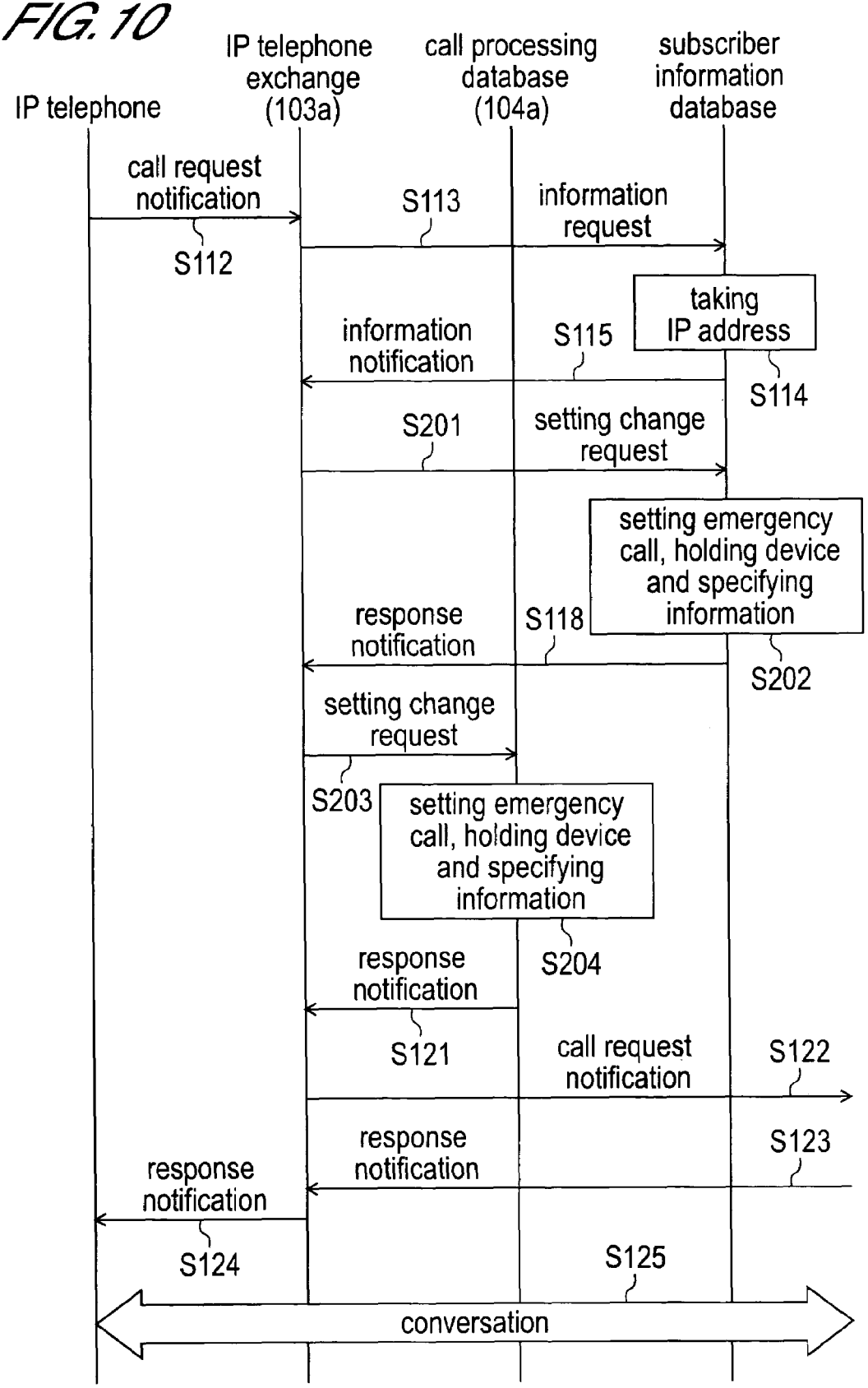
FIGS. 10 to 13 are schematic diagrams showing sequences of operations of an IP telephone system according to a second embodiment.

FIG. 10 is a schematic diagram showing sequence of an operation regarding an emergency call function of the present embodiment. In FIG. 10, the processes of the steps referred by same step numbers as those of in FIG. 5 are the same processes in the case of FIG. 5.

The processes of steps S112 to S115 are the same as in the case of the first embodiment (See FIG. 5). Firstly, the IP telephone terminal 101 transmits a call request notification to the IP telephone exchange 103a (See step S112 in FIG. 10). The IP telephone exchange 103a which receives the call request notification transmits an information request to the subscriber information database 105 (See step S113 in FIG. 10). The subscriber information database 105 transmits an information notification including an IP address corresponding to the calling telephone number to the IP telephone exchange 103a (See step S115 in FIG. 10).

Next, the IP telephone exchange 103a determines a holding device to be used. The IP telephone exchange 103a may determine a holding device which is used after a confirmation whether the holding device is acceptable for holding of the emergency call. Then, after a resource of the determined holding device is reserved, the IP telephone exchange 103a transmits a setting change request to the subscriber information database 105 (See step S201 in FIG. 10). In the present embodiment, a holding device specifying information is included in the setting change request. The subscriber information database 105 sets the connection status information of the subscriber information corresponding to the called telephone number to "emergency call" and writes the holding device specifying information (See step S202 in FIG. 10). Then, similar to the first embodiment, the subscriber information database 105 transmits a response notification to the IP telephone exchange 103a (See step S118 in FIG. 10).

Subsequently, the IP telephone exchange 103a transmits a setting change request to the call processing database 104a (See step S203 in FIG. 10). In the present embodiment, the holding device specifying information is included in the setting change request. When receiving the setting change request, the call processing database 104a sets the connection state information of the registered subscriber information corresponding to the called telephone number to "emergency call", and writes the holding device specifying information (See step S204 in FIG. 10). Then, similar to the first embodiment, the call processing database 104a transmits a response notification to the IP telephone exchange 103a (See step S121 in FIG. 10).

The steps S203 to S121 may be performed earlier than the steps S201 to S118.

After that, a call request notification is transmitted from the IP telephone exchange 103a to the emergency communication terminal 102a via the IP telephone exchange 103a (See step S122 in FIG. 10). A response notification is transmitted from to the emergency communication terminal 102a to the IP telephone exchange 103*a* via the IP telephone exchange 103*b* (See step S123 in FIG. 10). Further, the response notification is transmitted from the IP telephone exchange 103*a* to the IP telephone terminal 101 (See step S124 in FIG. 10). In this way, a call connection between the IP telephone terminal 101 and the emergency communication terminal 102*a* is established (See step S125 in FIG. 10).

Figure 11:
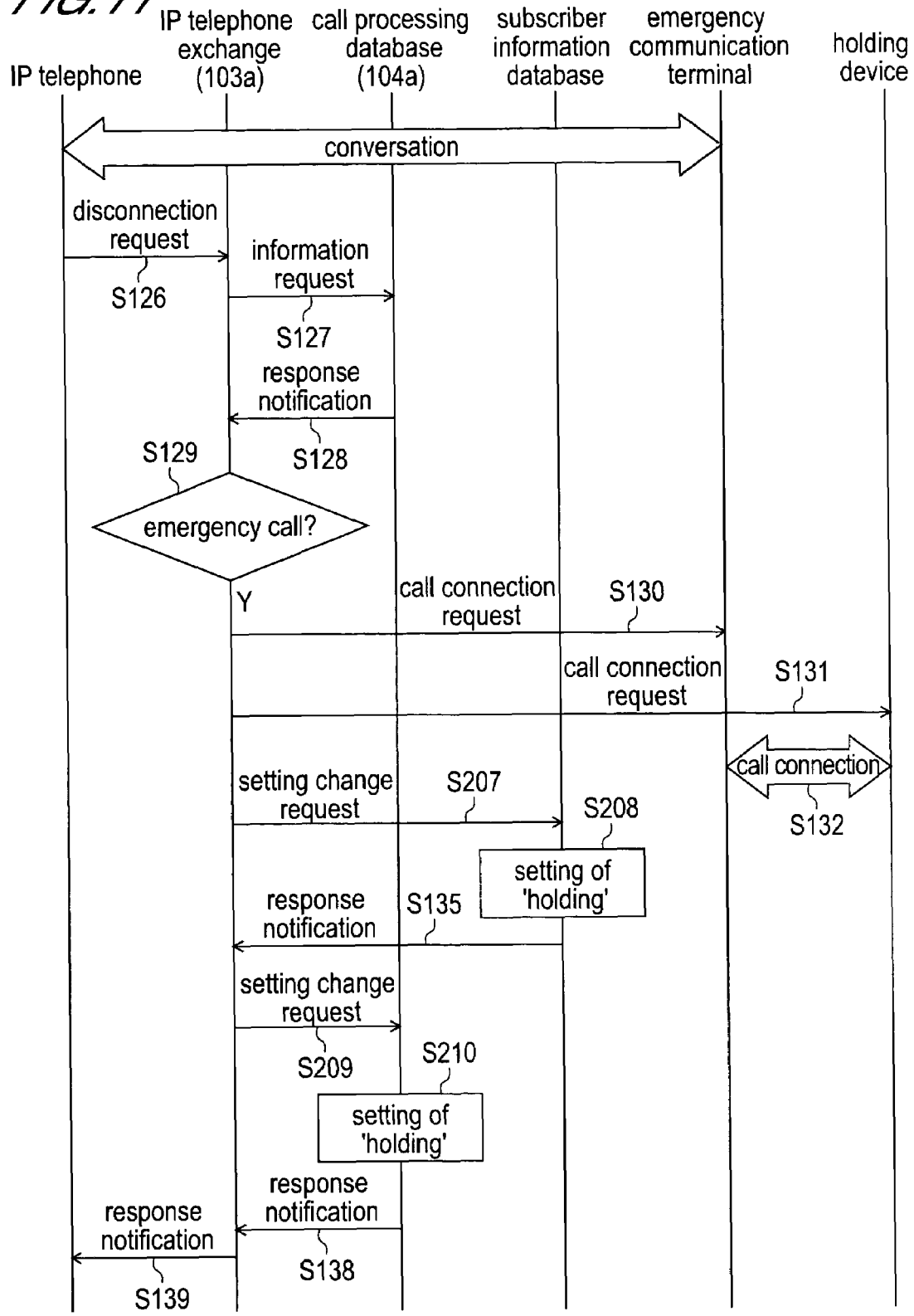

FIG. 11 is a schematic diagram showing sequence of an operation regarding a hold function of the present embodiment. In FIG. 11, the processes of the steps referred by same step numbers as those of in FIG. 6 are the same processes in the case of FIG. 6.

The processes of steps S126 to S131 are the same as in the case of the first embodiment. A disconnection request is transmitted from the IP telephone terminal 101 to the IP telephone exchange 103*a* (See step S126 in FIG. 11). An information request is transmitted from the IP telephone exchange 103*a* to the call processing database 104*a* (See step S127 in FIG. 11). A response notification is transmitted from the call processing database 104*a* to the IP telephone exchange 103*a* (See step S128 in FIG. 11). When the connection status information is "emergency call", the IP telephone exchange 103*a* requests a call connection to the emergency communication terminal 102*a* and the holding device 106 (See steps S129, S130 and S131 in FIG. 10).

Then, the IP telephone exchange 103*a* transmits a setting change request to the subscriber information database 105 (See step S207 in FIG. 11). The setting change request is different from that of the first embodiment on the point that a holding device specifying information is not included. The subscriber information database 105 sets the connection status information of the subscriber information corresponding to the IP telephone terminal 101 to "holding" (See step S208 in FIG. 11, and FIG. 3). Here, the subscriber information database 105 does not write the holding device specifying information. This is because the holding device specifying information is already written when the call connection of the emergency call is established (See step S202 in FIG. 11). Then, the subscriber information database 105 transmits a response notification to the IP telephone exchange 103*a* (See step S135 in FIG. 11).

The IP telephone exchange 103*a* transmits a setting change request to the call processing database 104*a* (See step S209 in FIG. 11). The setting change request does not include a holding device specifying information. The call processing database 104*a* sets the connection status information of the registered subscriber information corresponding to the IP telephone terminal 101 to "holding" (See step S210 in FIG. 11). Here, the subscriber information database 104*a* does not write a holding device specifying information. This is because the holding device specifying information is already written when the call connection of the emergency call is established (See step S204 in FIG. 11).

The call processing database 104*a* transmits a response notification to the IP telephone exchange 103*a* (See step S138 in FIG. 11). Further, the IP telephone exchange 103*a* transmits a response notification to the IP telephone terminal 101 (See step S139 in FIG. 11).

The steps S207 to S138 may be performed earlier than the steps S205 to S135.

Figure 12:
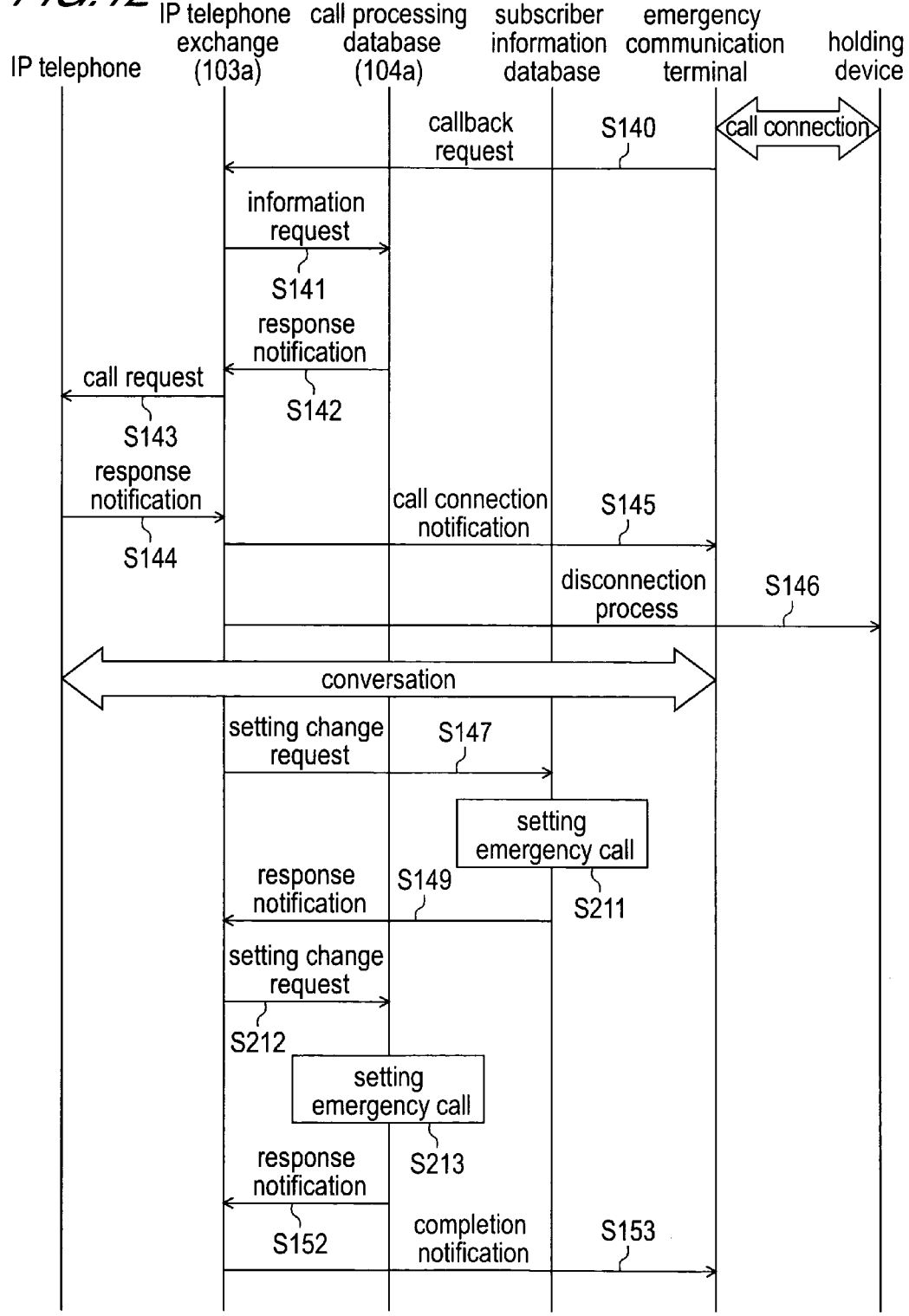

FIG. 12 is a schematic diagram showing sequence of an operation regarding a callback function. In FIG. 12, the processes of the steps referred by same step numbers as those of in FIG. 7 are the same processes in the case of FIG. 7.

Same as the first embodiment, a callback request is transmitted from the emergency communication terminal 102*a* to the IP telephone exchange 103*a* (See step S140 in FIG. 12).

An information request is transmitted from the IP telephone exchange 103*a* to the call processing database 104*a* (See step S141 in FIG. 12). A response notification is transmitted from the call processing database 104*a* to the IP telephone exchange 103*a* (See step S142 in FIG. 12). Further, call request notification is transmitted from the IP telephone exchange 103*a* to the IP telephone terminal 101 (See step S143 in FIG. 12). A response notification is transmitted from the IP telephone terminal 101 to the IP telephone exchange 103*a* (See step S144 in FIG. 12). The IP telephone exchange 103*a* establishes a call connection between the emergency communication terminal 102*a* and the IP telephone terminal 101 (See step S145 in FIG. 12). At all most the same time, the IP telephone exchange 103*a* disconnects the call connection with the holding device 106 (See step S146 in FIG. 12).

The subscriber information database 105 receives the setting change request (See step S147 in FIG. 12) and sets the connection state information of the subscriber information corresponding to the IP telephone terminal 101 to "emergency call" (See step S211 in FIG. 12). In the present embodiment, the subscriber information database does not delete the holding device specifying information here. This is because there is a case where a callback connection is transferred to a connection in a hold state.

The IP telephone exchange 103*a* receives a response notification from the subscriber information database 105 (See step S149 in FIG. 12) and transmits a setting change request to the call processing database 104*a* (See step S212 in FIG. 12). The call processing database 104*a* sets the connection state information of the registered subscriber information corresponding to the IP telephone terminal 101 to "emergency call" (See step S213 in FIG. 12). In the present embodiment, the call processing database 104*a* does not delete the holding device information here. The call processing database 104*a* transmits a response notification to the IP telephone exchange 103*a* (See step S152 in FIG. 12).

The steps S212 to S152 may be performed earlier than the steps S147 to 149.

Finally, the completion of the callback process is notified to the emergency communication terminal 102*a* (See step S153 in FIG. 12).

Figure 13:
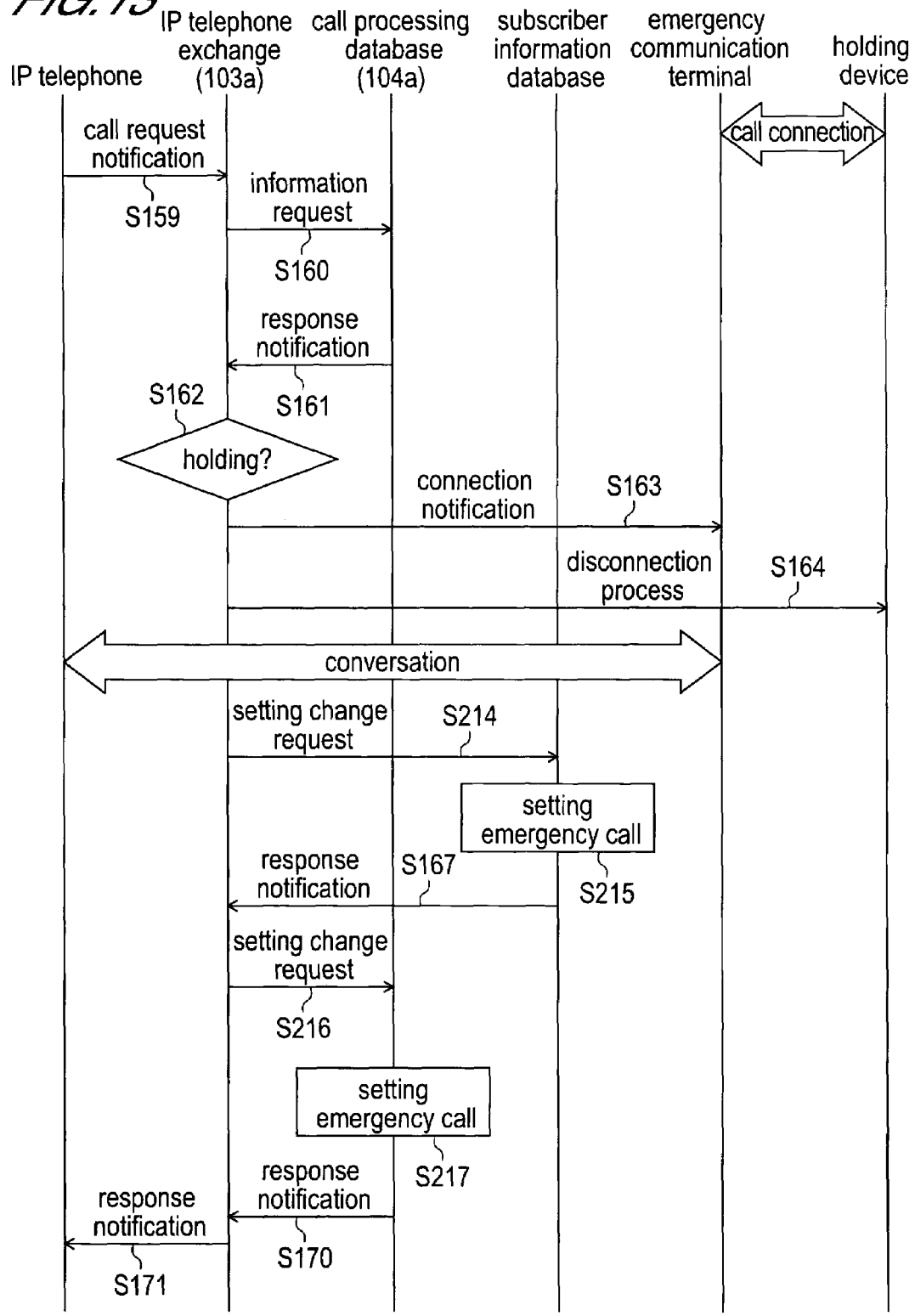

FIG. 13 is a schematic diagram showing sequence of an operation regarding a connection recovery function of the present embodiment. In FIG. 13, the processes of the steps referred by same step numbers as those of in FIG. 9 are the same processes in the case of FIG. 9.

Same as the first embodiment, a call request is transmitted from the IP telephone terminal 101 to the IP telephone exchange 103*a* (See step S159 in FIG. 13). An information request is transmitted from the IP telephone exchange 103*a* to the call processing database 104*a* (See step S160 in FIG. 13). A response notification is transmitted from the call processing database 104*a* to the IP telephone exchange 103*a* (See step S161 in FIG. 13). When the connection state information indicates 'holding' (See step S612 in FIG. 13), the IP telephone exchange 103*a* notifies the emergency communication terminal 102*a* that a call connection with the IP telephone terminal 101 will be established (See step S163 in FIG. 13). At all most same time, the IP telephone exchange 103*a* disconnects the call connection with the holding device 106 (See step S164 in FIG. 13).

The subscriber information database 105 receives a setting change request (See step S214 in FIG. 13) and sets the connection state information of the subscriber information corresponding to the IP telephone terminal 101 to "emergency call" (See step S215 in FIG. 13). In the present embodiment, the subscriber information database 105 does not delete the holding device specifying information here. This is because there may be a case where a call connection is transferred to be in a hold state after the connection recovery.

The IP telephone exchange 103a receives a response notification from the subscriber information database 105 (See step S167 in FIG. 13) and transmits a setting change request to the call processing database 104a (See step S216 in FIG. 13). The call processing database 104a sets the connection state information of the registered information corresponding to the IP telephone terminal 101 to "emergency call" (See step S217 in FIG. 13). In the present embodiment, the call processing database 104a does not delete the holding device specification information here. The call processing database 104a transmits a response notification to the IP telephone exchange 103a (See step S170 in FIG. 13). The IP telephone exchange 103a transmits the response notification to the IP telephone terminal 101 (See step S1711 in FIG. 13).

The steps S216 to S170 may be performed earlier than the steps S214 to S167.

The system of the present embodiment improves the assurance of the holding process as the resource for holding is remained when the emergency call connection is established.

Third Embodiment

A third embodiment of the present invention will be explained with reference to FIGS. 14 to 20.

The present embodiment is different from the first embodiment on the point that the system of the present embodiment comprises a function to remain the connection when an IP telephone terminal in a hold state is moved (that is a case where an IP telephone exchange which manages an IP telephone terminal 101 is switched).

Figure 14:
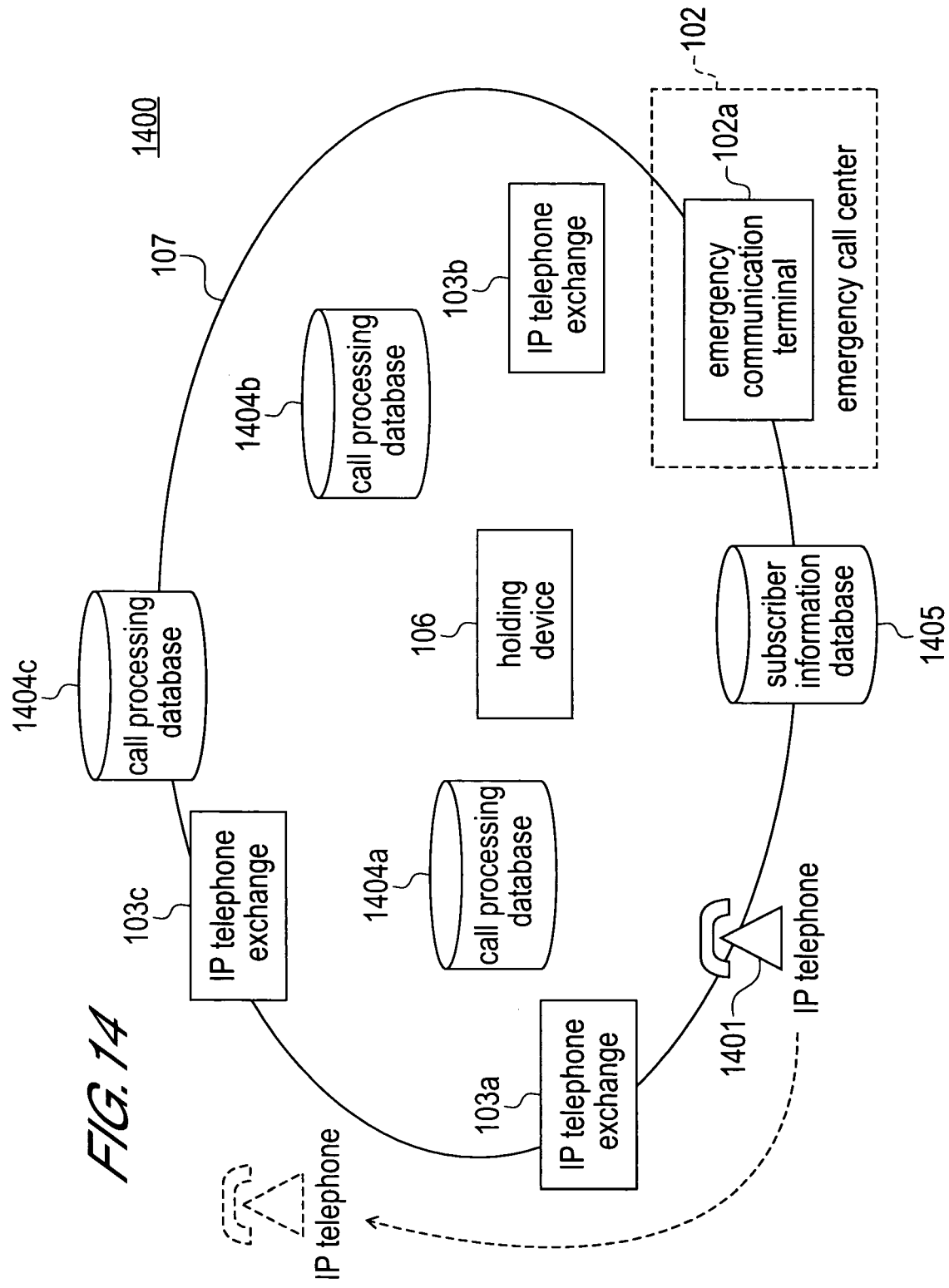
FIG. 14 is a schematic diagram showing a network structure of an IP telephone system according to a third embodiment.

FIG. 14 is a schematic diagram showing a network structure of an IP telephone system 1400 according to the present embodiment. In FIG. 14, the elements referred by same numbers as those of in FIG. 1 are the same element in the case of FIG. 1.

As shown in FIG. 14, the IP telephone system 1400 includes an IP telephone terminal 1401, an IP telephone exchange 103c, call processing databases 1404a, 1404b, 1404c, a subscriber information database 1405.

The IP telephone terminal 1401 is a mobile type IP telephone set, for example a mobile computer with an installed application for IP telephone and having a wireless communication function.

The IP telephone exchange 103c has a same structure as the IP telephone exchanges IP telephone exchange 103a, 103b according to the first embodiment.

Figure 15:
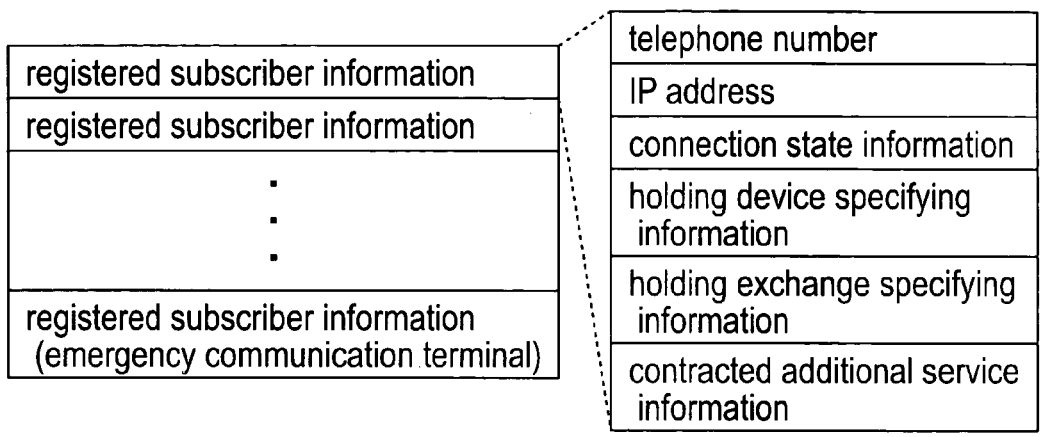
FIG. 15 is a schematic diagram showing a data structure of a call processing database according to the third embodiment.

The call processing databases 1404a to 1404c stores data of the IP telephone terminal registered in the relevant IP telephone exchanges 103a to 103b. Same as the first embodiment, each IP telephone exchange 103a to 103c have a single call processing database respectively. The call processing databases 1404a to 1404c may be built into the relevant IP telephone exchange or may be connected to the network in use of dedicated cables. FIG. 15 is a schematic diagram showing a structure of data stored in the call processing databases 1404a to 1404c. As shown in FIG. 15, the structure of data stored in the call processing databases 1404a to 1404c is different from that of the first embodiment on the point that holding exchange specifying information is included.

Figure 16:
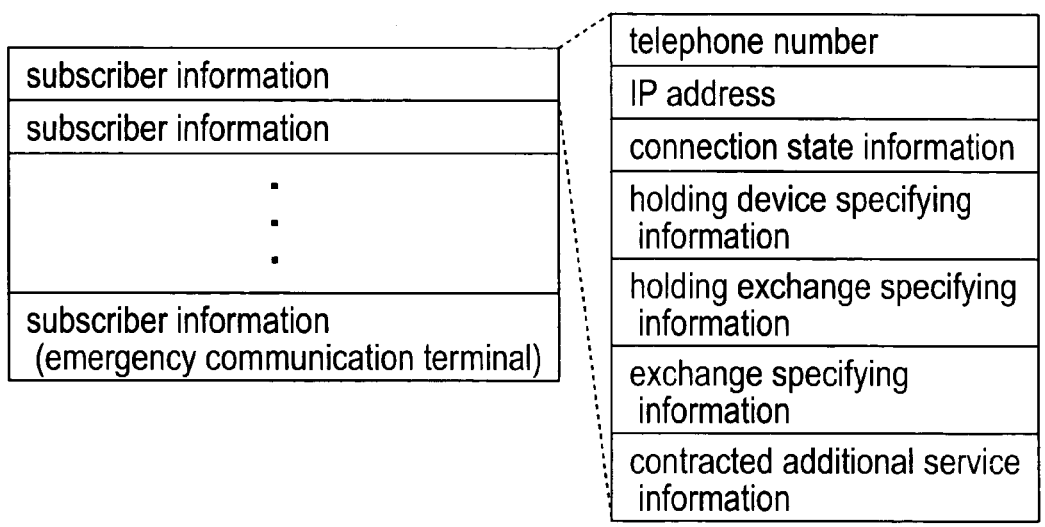
FIG. 16 is a schematic diagram showing a data structure of a subscriber information database according to the third embodiment.

The subscriber information database 1405 stores data of all subscribers to whom service of the communication carrier is provided. The subscriber information database 1405 is, preferably, composed in use of nonvolatile storage. The subscriber information database 1405 is shared by a plurality of IP telephone exchanges 103a to 103c which belong to the same telecommunication carrier (that is, a plurality of IP telephone exchanges 103 connected to the same VoIP network 107). Here, the number of the subscriber information database 1405 is not required to be one and a plurality of distributed storages may constitute a single database. FIG. 16 is a schematic diagram showing a structure of data stored in the subscriber information database 1405. As shown in FIG. 16, the structure of data stored in the subscriber information database 1405 is different from that of the first embodiment on the point that holding exchange specifying information is included.

Figure 17:
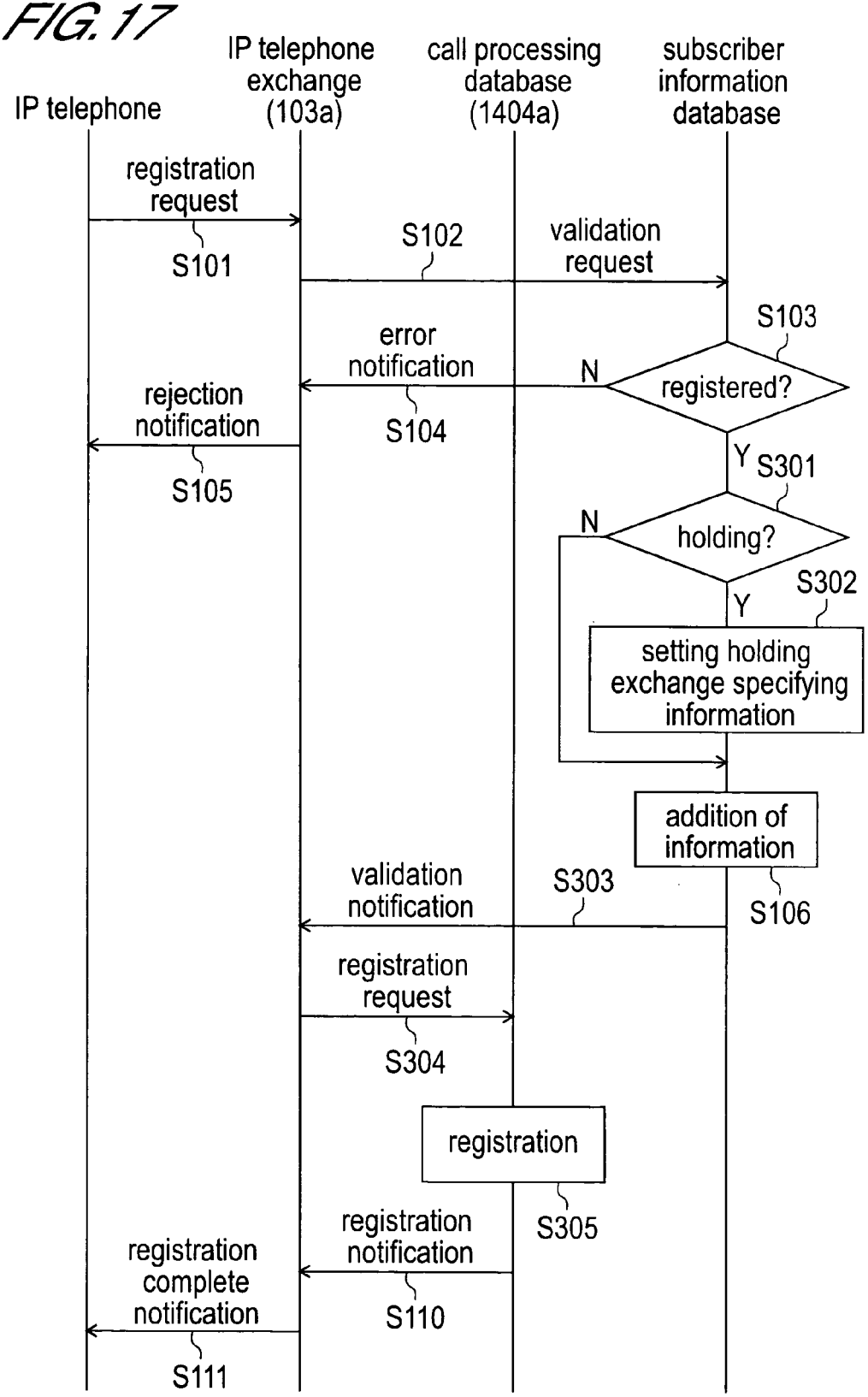
FIGS. 17 to 20 are schematic diagrams showing sequences of operations of the IP telephone system according to the third embodiment.

FIG. 17 is a schematic diagram showing sequence of an operation regarding a re-registration function of the present embodiment. In FIG. 17 the processes of the steps referred by same step numbers as those of in FIG. 4 are the same processes in the case of FIG. 4.

The behaviors of the steps S101 to S105 are the same as those of the first embodiment. When the IP telephone terminal 1401 is connected to the IP telephone exchange 103c via a communication cable and turned on, the IP telephone terminal 1401 transmits a registration request to the IP telephone exchange 103c (See step S101 in FIG. 17). The IP telephone exchange 103c transmits a validation request to the subscriber information database 1405 (See step S102 in FIG. 17). The subscriber information database 1405 searches subscriber information corresponding to the telephone number of the IP telephone terminal 1401 (See step S103 in FIG. 17) and transmits an error notification when relevant information is not stored (See step S104 in FIG. 17). When the IP telephone exchange 103c receives the error notification, the IP telephone exchange 103c transmits a notification notifying that the registration is rejected to the IP telephone terminal 1401 (See step S105 in FIG. 17).

When the subscriber information corresponding to the telephone number of the IP telephone terminal 1401 is stored (See step S103 in FIG. 17), the subscriber information database 1405 checks the connection state information of the IP telephone terminal 1401 (See step S301 in FIG. 17). Then, when the connection state information is "holding" and the holding exchange specifying information is not set, the subscriber information database 1405 reads the exchange specifying information and write it to the storing area of the holding exchange specifying information (See step S302 in FIG. 17). This is because that the connection state information become "holding" and the holding exchange specifying information become not to be set when an IP telephone exchange corresponding to the exchange specifying information (for example, the IP telephone exchange 103a) performed the holding process. On the other hand, when the connection state information is not "holding" or the holding exchange specifying information is already set, the subscriber information database 1405 does not write such information. Further, the subscriber information database 1405 writes a telephone number, an IP address, and an exchange specifying information included in the validation request to the subscriber information (See step S106 in FIG. 17). The subscriber information database 1405 takes connection state information, holding device specifying information and contracted additional service information from the subscriber information. Then, the subscriber information database 1405 transmits a validation notification including these information and the holding exchange specifying information (See step S303 in FIG. 17).

When receiving the validation notification, the IP telephone exchange 103c transmits a registration request to the call processing database 1404c (See step S304 in FIG. 17). In the registration request, the telephone number, the IP address, the connection state information, the holding device specifying information, the holding exchange specifying information and the contracted additional service information of the IP telephone terminal 1401 are included.

When receiving the registration request, the call processing database 1404c creates registered subscriber information including the telephone number, the IP address, the connection state information, the holding device specifying information, the holding exchange specifying information and the contracted additional service information of the IP telephone terminal 1401 (See step S305 in FIG. 17). After the registration is finished, the call processing database 1404c transmits a registration complete notification (See step S110 in FIG. 17).

When receiving the registration complete notification, the IP telephone exchange 103c transmits the registration complete notification (See step S111 in FIG. 17).

When the registration complete notification is received by the IP telephone terminal 101, the registration process is finished.

The sequence of an emergency call according the present embodiment is the same as that in the case of the present embodiment (See FIG. 5), so the explanation is not repeated here.

Figure 18:
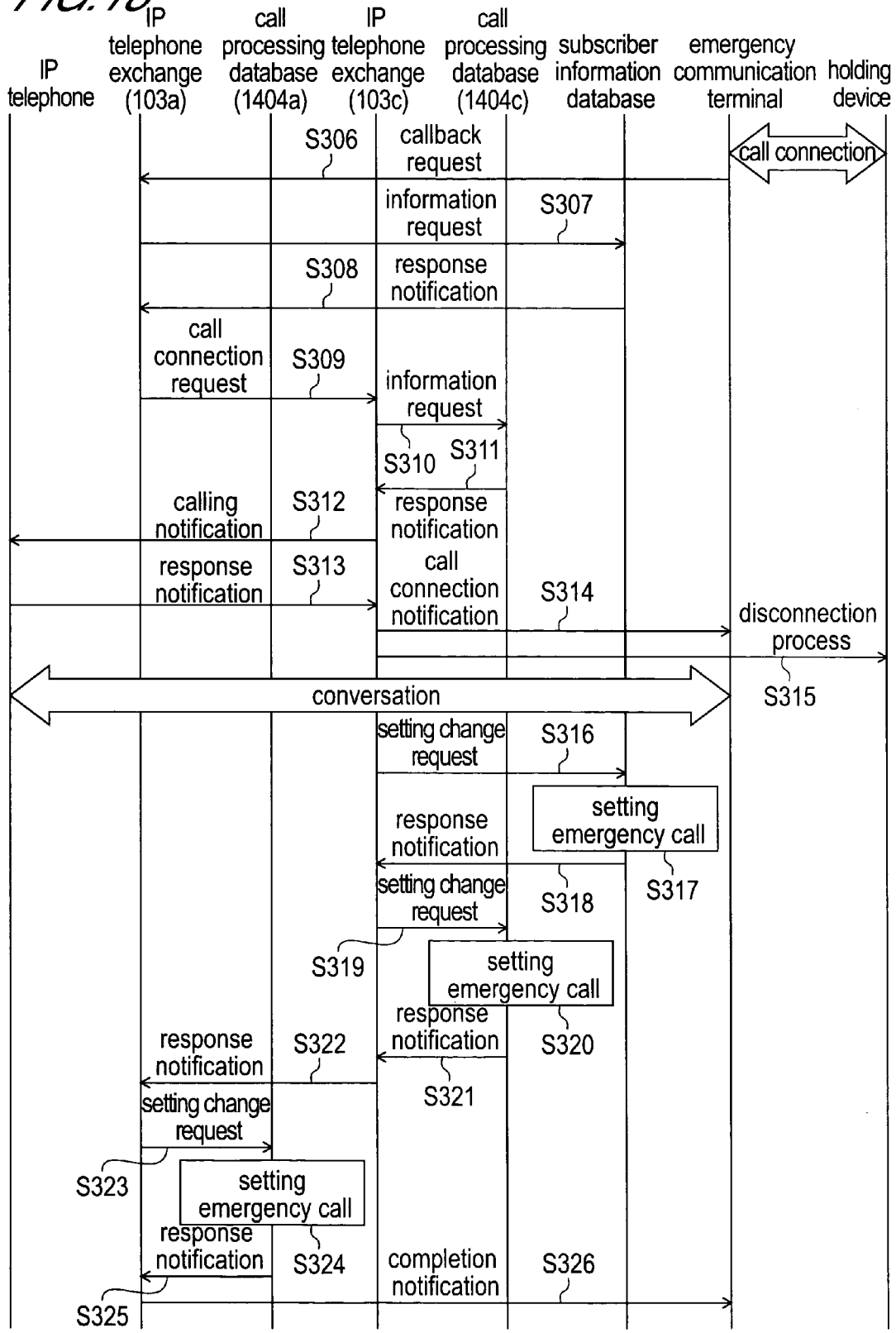

FIG. 18 is a schematic diagram showing sequence of an operation regarding the callback function of the present embodiment. By an operation by an operator, the emergency communication terminal 102a transmits a callback request (See step S306 in FIG. 18). The callback request includes the telephone number of the IP telephone terminal 1401.

The IP telephone exchange 103a transmits an information request to the subscriber information database 1405 (See step S307 in FIG. 18).

When receiving the information request, the subscriber information database 1405 checks the registered subscriber information corresponding to the telephone number of the IP telephone terminal 1401. When the connection state information is "holding", the subscriber information database 1405 transmits a response notification including the connection state information, the holding device specifying information and the holding exchange specifying information to the IP telephone exchange 103a (See step S308 in FIG. 18).

The IP telephone exchange 103a checks the received response notification. When the connection state information is "holding", the IP telephone exchange 103a further checks the holding exchange specifying information. Then, the holding exchange specifying information identifies the IP telephone exchange 103a itself, the IP telephone exchange 103a performs a callback process same as the first embodiment (See FIG. 7). On the other hand, the holding exchange specifying information identifies another exchange, the IP telephone exchange 103a transmits a connection request to the relevant IP telephone exchange (here, the IP telephone exchange 103c) (See step S309 in FIG. 18).

When receiving the connection request, the IP telephone exchange 103c transmits an information request to the call processing database 1404c (See step S310 in FIG. 18). In the information request, the telephone number of the IP telephone terminal 1401 is included.

When receiving the information request, the call processing database 1404c takes the connection state information, the holding device specifying information, the holding exchange specifying information from the registered subscriber information corresponding to the telephone number. Then, the call processing database 1404c transmits a response notification including the connection state information to the IP telephone exchange 103c (See step S311 in FIG. 18).

Subsequently, the IP telephone exchange 103c transmits a call request notification to the IP telephone terminal 1401 (See step S312 in FIG. 18). The IP telephone terminal 1401 transmits a response notification corresponding to the call request notification to the IP telephone exchange 103c (See step S313 in FIG. 18).

When receiving the response notification, the IP telephone exchange 103c notifies the emergency communication terminal 102a that a call connection with the IP telephone terminal 1401 will be established (See step S314 in FIG. 18). At all most the same time, the IP telephone exchange 103c provides the holding device with a process for disconnecting the call connection with the emergency communication terminal 102a (See step S315 in FIG. 18).

As described above, a conversation between the emergency communication terminal 102a and the IP telephone terminal 1401 is realized.

Subsequently, the IP telephone exchange 103c transmits a setting change request to the subscriber information database 1405 (See step S316 in FIG. 18). When receiving the setting change request, the subscriber information database 1405 sets the connection state information of the subscriber information corresponding to the IP telephone terminal 1401 to "emergency call" and deletes the holding device specifying information (See step S317 in FIG. 18). Then, the subscriber information database 1405 transmits a response notification to the IP telephone exchange 103c (See step S318 in FIG. 18).

The IP telephone exchange 103c transmits a setting change request to the call processing database 1404c (See step S319 in FIG. 18). When receiving the setting change request, the call processing database 1404c sets the connection state information to "emergency call" and deletes the holding device specifying information (See step S320 in FIG. 18). Then, the call processing database 1404c transmits a request notification to the IP telephone exchange 103c (See step S321 in FIG. 18).

The steps S319 to S321 may be performed earlier than the steps S316 to S318.

Subsequently, the IP telephone exchange 103c transmits the response notification to the IP telephone exchange 103a (See step S322 in FIG. 18). When receiving the response notification, the IP telephone exchange 103c transmits a setting change request to the call processing database 1404a (See step S323 in FIG. 18). When receiving the setting change request, the call processing database 1404a sets the connection state information to "emergency call" and deletes the holding device specifying information (See step S324 in FIG. 18). Then, the call processing database 1404a transmits a response notification to the IP telephone exchange 103a (See step S325 in FIG. 18).

Finally, the completion of the callback process is notified from the IP telephone exchange 103a to the emergency communication terminal 102a (See step S326 in FIG. 18).

Figure 19:
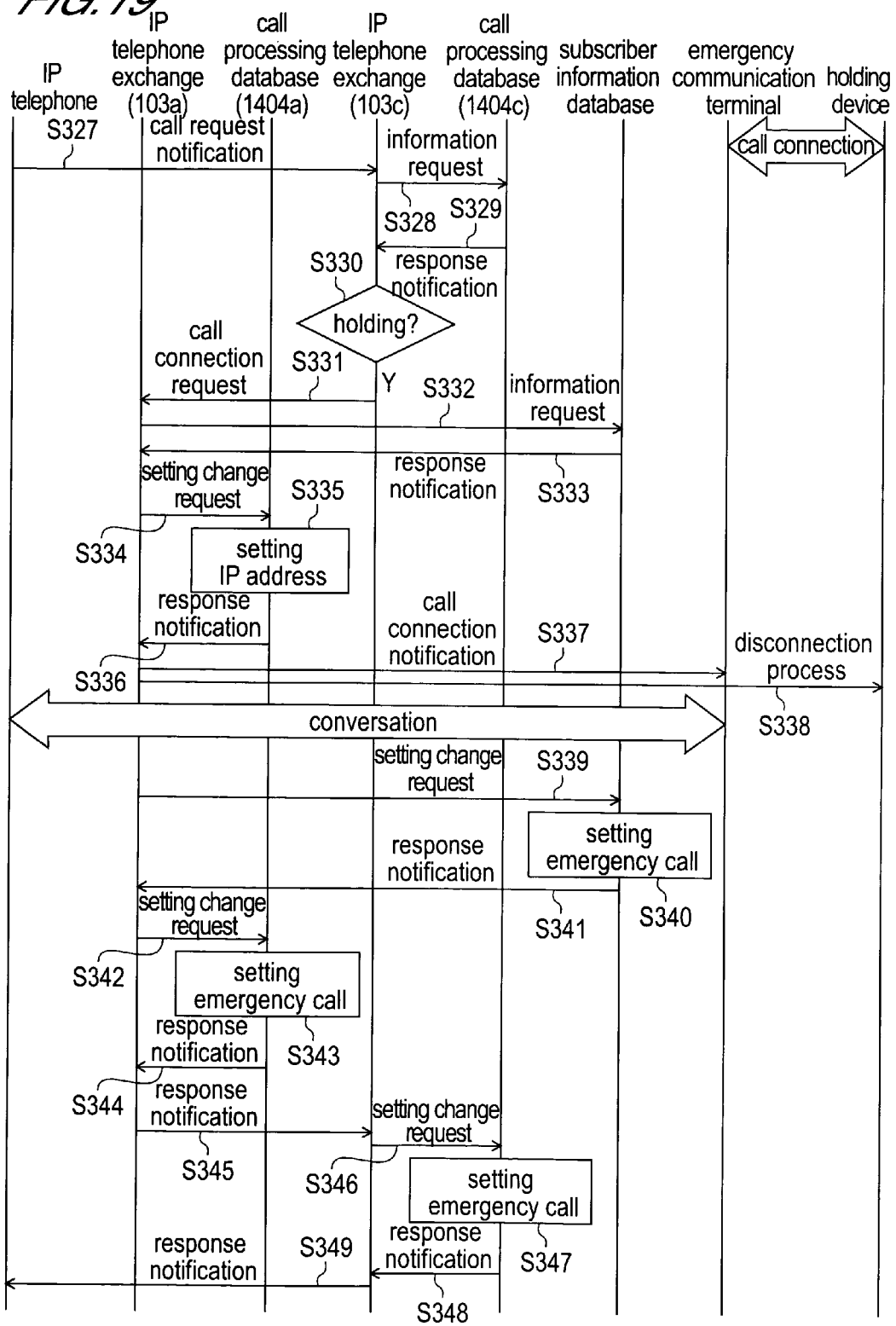

FIG. 19 is a schematic diagram showing sequence of an operation regarding a connection recovery function of the present embodiment. After a call request notification is transmitted from the IP telephone terminal 1401 to the IP telephone exchange 103c (See step S327 in FIG. 17), the IP telephone exchange 103c transmits an information request to the call processing database 1404c (See step S328 in FIG. 19).

When receiving the information request, the call processing database 1404c takes corresponding connection state information, holding device specifying information, holding exchange specifying information. The call processing database 1404c transmits a response notification including the information to the IP telephone exchange 103c (See step S329 in FIG. 19).

The IP telephone exchange 103c checks the received response notification (See step S330 in FIG. 19). When the connection state information is "holding", the IP telephone exchange 103a transmits a connection request to the IP telephone exchange indicated by the holding exchange specifying information (here, the IP telephone exchange 103a) (See step S331 in FIG. 19).

When receiving the connection request, the IP telephone exchange 103a transmits an information request to the subscriber information database 1405 (See step S332 in FIG. 19). The subscriber information database 1405 transmits a response notification including the IP address to the IP telephone exchange 103a (See step S333 in FIG. 19).

When receiving the response notification, the IP telephone exchange 103a rewrites the IP address of the call processing database 1404a (See steps S34, S335, and S336 in FIG. 19). Then, the IP telephone exchange 103a notifies to the emergency communication terminal 102a that a call connection with the IP telephone terminal 1401 will be established (See step S337 in FIG. 19). At all most the same time, the IP telephone exchange 103a provides the holding device with a process for disconnecting the call connection with the emergency communication terminal 102a (See step S338 in FIG. 19).

As described above, a conversation between the emergency communication terminal 102a and the IP telephone terminal 1401 is realized.

Subsequently, the IP telephone exchange 103a transmits a setting change request to the subscriber information database 1405 (See step S339 in FIG. 19). When receiving the setting change request, the subscriber information database 1405 sets the connection state information of the subscriber information corresponding to the IP telephone terminal 1401 to "emergency call" and deletes the holding device specifying information (See step S340 in FIG. 19). Then, the subscriber information database 1405 transmits a response notification to the IP telephone exchange 103a (See step S341 in FIG. 19).

Then, the IP telephone exchange 103a transmits a setting change request to the call processing database 1404a (See step S341 in FIG. 19). When receiving the setting change request, the call processing database 1404a sets the connection state information of the registered subscriber information corresponding to the IP telephone terminal 1401 to "emergency call" and deletes the holding device specifying information (See step S342 in FIG. 19). The call processing database 1404a transmits a response notification to the IP telephone exchange 103a (See step S344 in FIG. 19).

The steps S342 to S344 may be performed earlier than the steps S339 to S341.

Then, the IP telephone exchange 103a transmits a response notification to the IP telephone exchange 103c (See step S345 in FIG. 19). The IP telephone exchange 103c transmits a setting change request to the call processing database 1404c (See step S346 in FIG. 19). When receiving the setting change request, the call processing database 1404c sets the connection state information of the registered subscriber information corresponding to the IP telephone terminal 1401 to "emergency call" and deletes the holding device specifying information (See step S347 in FIG. 19). Then, the call processing database 1404c transmits a response notification to the IP telephone exchange 103c (See step S348 in FIG. 19).

The IP telephone exchange 103c transmits the response notification to the IP telephone terminal 1401 (See step S349 in FIG. 19). Accordingly, the connection recovery process is finished.

Figure 20:
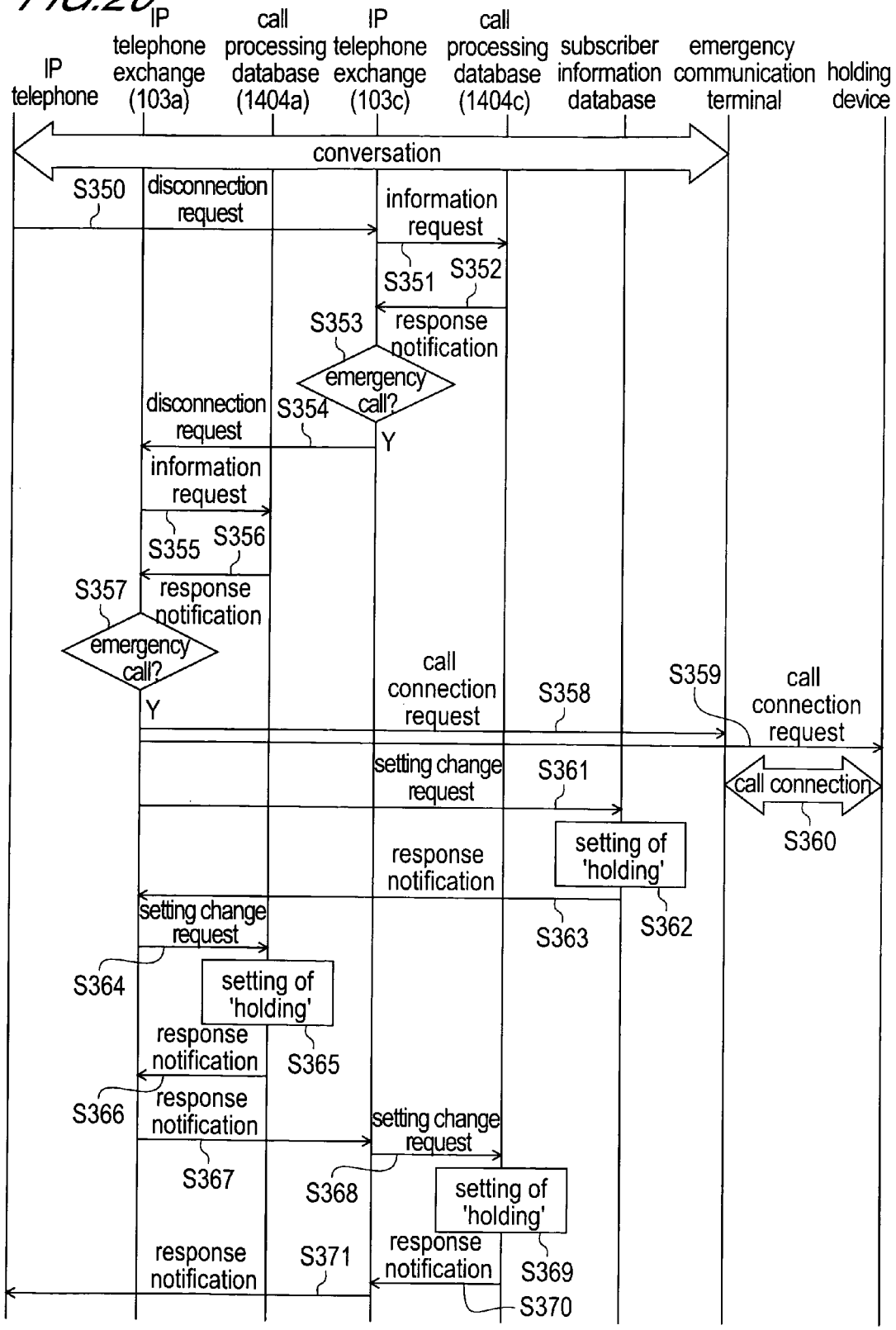

FIG. 20 is a schematic diagram showing sequence of an operation regarding re-hold function of the present embodiment.

After the IP telephone terminal 1401 in which a call connection is in a hold state moves and the above call back or connection recovery is performed, the following process is performed when the call connection will be in a hold state again.

After a disconnection request is transmitted from the IP telephone terminal 1401 to the IP telephone exchange 103c (See step S350 in FIG. 20), the IP telephone exchange 103c transmits an information request to the call processing database 1404c (See step S351 in FIG. 20). The call processing database 1404c takes the IP address, connection state information, holding exchange specifying information, and transmits a response notification including these information to the IP telephone exchange 103c (See step S352 in FIG. 20).

The IP telephone exchange 103c takes and checks the connection state information from the received response notification (See step S353 in FIG. 20). Then, when the connection state information is not "emergency call", a normal connection disconnection process is performed. On the other hand, when the taken connection state information is "emergency call", the following call connection holding process is performed.

Firstly, the IP telephone exchange 103c transmits a disconnection request to the IP telephone exchange 103a (See step S354 in FIG. 20).

The IP telephone exchange 103a transmits an information request to the call processing database 1404a (See step S355 in FIG. 20). The call processing database 1404a takes the IP address, connection state information, holding exchange specifying information, and transmits a response notification including these information to the IP telephone exchange 103a (See step S356 in FIG. 20).

The IP telephone exchange 103a takes and checks the connection state information from the received response (See step S357 in FIG. 20). Then, when the connection state information is not "emergency call", a normal disconnection process is performed. On the other hand, when the connection state information is "emergency call", the IP telephone exchange 103a requests for a call connection to the emergency communication terminal 102a and the holding device 106 (See steps S358 and S359 in FIG. 20). Accordingly, a call connection in a hold state is established between the emergency communication terminal 102a and the holding device 106 (See step S360 in FIG. 20).

Subsequently, the IP telephone exchange 103a transmits a setting change request to the subscriber information database 1405 (See step S361 in FIG. 20). When receiving the setting change request, the subscriber information database 1405 sets the connection state information of the subscriber information corresponding to the IP telephone terminal 1401 to "holding" and writes information regarding the holding device 106 to the holding device specifying information of the subscriber information (See step S362 in FIG. 20). Then, the subscriber information database 1405 transmits a response notification to the IP telephone exchange 103a (See step S363 in FIG. 20).

Then, the IP telephone exchange 103a transmits a setting change request to the call processing database 1404a (See step S364 in FIG. 20). When receiving the setting change request, the call processing database 1404a sets the connection state information of the registered subscriber information corresponding to the IP telephone terminal 1401 to "holding" and writes information regarding the holding device 106 to the holding device specifying information of the registered subscriber information (See step S365 in FIG. 20, and FIG. 2). Then, the call processing database 1404a transmits a response notification to the IP telephone exchange 103a (See step S366 in FIG. 20).

The steps S364 to S366 may be performed earlier than the steps S361 to S363.

Subsequently, the IP telephone exchange 103a transmits a response notification to the IP telephone exchange 103c (See step S367 in FIG. 20). The IP telephone exchange 103c transmits a setting change request to the call processing database 1404c (See step S368 in FIG. 20). When receiving the setting change request, the call processing database 1404c sets the connection state information of the registered subscriber information corresponding to the IP telephone terminal 1401 to "holding" and writes information regarding the holding device 106 to the holding device specifying information of the registered subscriber information (See step S369 in FIG. 20). Then, the call processing database 1404c transmits a response notification to the IP telephone exchange 103c (See step S370 in FIG. 20).

Then the IP telephone exchange 103a transmits the response notification to the IP telephone terminal 1401 (See step S371 in FIG. 20). Accordingly, the IP telephone terminal 1401 is put in a hold state.

The present embodiment is explained with an example of a case where the call connection control is performed by the IP telephone exchange 103a which manages the IP telephone terminal 1401 before the IP telephone terminal 1401 moves; however, the call connection control may be performed by the IP telephone exchange 130c which manages the IP telephone terminal 1401 after the IP telephone terminal 1401 moves.

When the emergency communication terminal 102a becomes on-hook state in a condition that an emergency call connection is established, a normal call disconnection process is performed.

According to the present embodiment, even when the IP telephone terminal 1401 in a hold state is moved, the callback and connection recovery can be performed, and further, a call connection after the callback and connection recovery can be put in a hold state again.

Fourth Embodiment

A fourth embodiment of the present invention will be explained with reference to FIGS. 21 to 23.

A system structure and function of an IP telephone system according to the present embodiment is the same as the system 1400 according to the third embodiment. The present embodiment is different from the third embodiment on the point that a holding device to be used is determined when an emergency call is connected.

The sequence of an operation regarding emergency call function of the present embodiment is the same as the case of the second embodiment (See FIG. 10). That is, after an IP telephone exchange 103a receives a call request notification from an IP telephone terminal 1401, the IP telephone exchange 103a reserves a resource in a holding device to be used. Then the IP telephone exchange 103a let a subscriber information database 1405 and a call processing database 1404a to perform a process to set connection state information to "emergency call" and a process to write holding device specifying information (See steps S202 and S204 in FIG. 10).

Other processes are the same as those when a resource in holding device is not reserved.

A re-registration process according to the present embodiment is the same as that in the case of the third embodiment.

Figure 21:
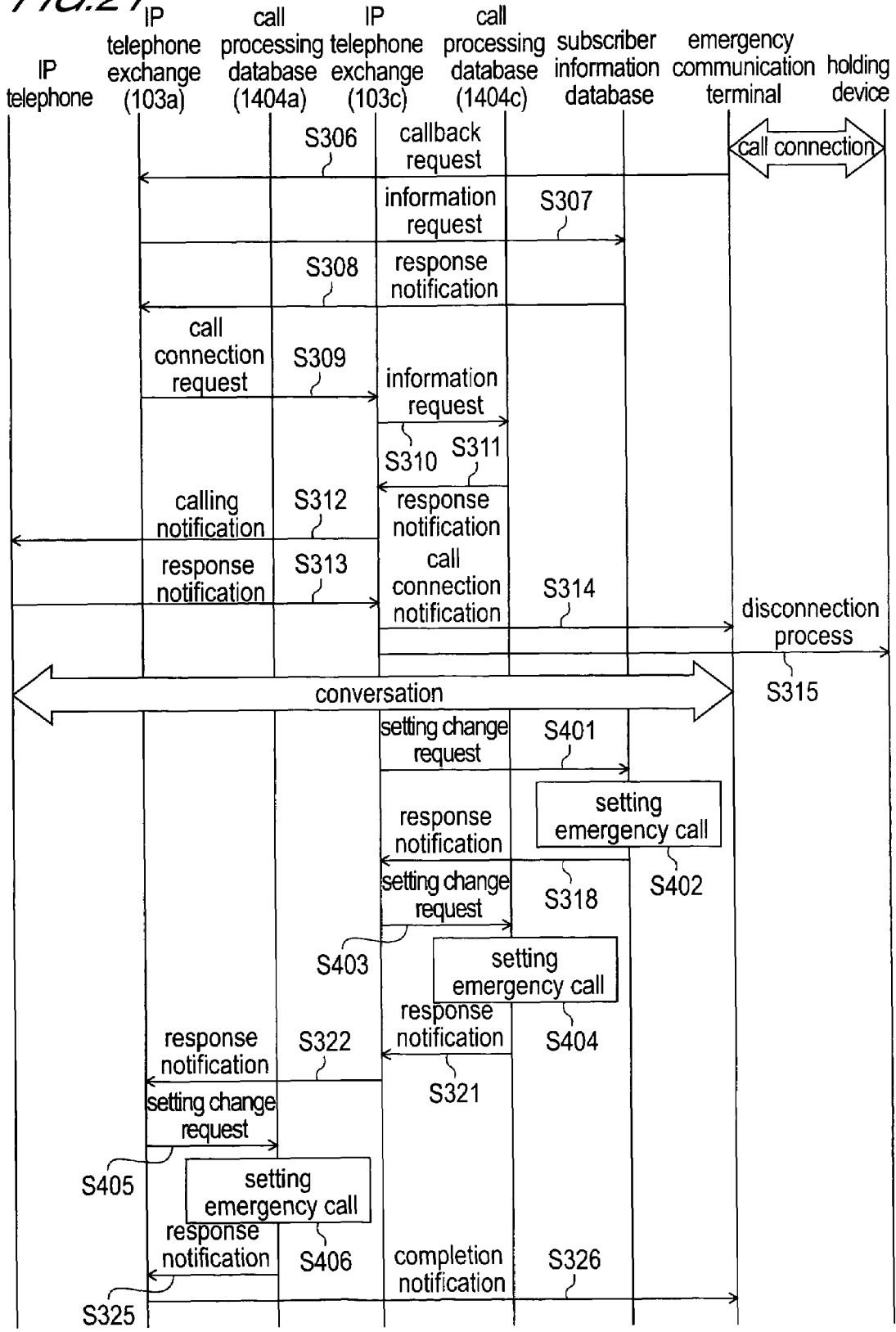
FIGS. 21 to 23 are schematic diagrams showing sequences of operations of an IP telephone system according to a fourth embodiment.

FIG. 21 is a schematic diagram showing sequence of an operation regarding callback function of the present embodiment. In FIG. 21, the processes of the steps referred by same step numbers as those of in FIG. 18 are the same processes in the case of FIG. 18.

The processes of steps S306 to S315 are the same as those of FIG. 18. The emergency communication terminal 102a transmit a callback request (See step S306 in FIG. 21), the IP telephone exchange 103a transmits an information request to the subscriber information database 1405 (See step S307 in FIG. 21), and the subscriber information database 1405 transmits an response notification including holding exchange specifying information to the IP telephone exchange 103a (See step S308 in FIG. 21). The IP telephone exchange 103c transmits a connection request to an exchange indicated by the holding exchange specifying information, that is, the IP telephone exchange 103a (See step S309 in FIG. 21). The IP telephone exchange 103a transmits an information request to the call processing database 1404c (See step S310 in FIG. 21), and the call processing database 1404c transmits a response notification including the holding exchange specifying information to the IP telephone exchange 103c (See step S311 in FIG. 21). Then, the IP telephone exchange 103c transmits a call request notification to the IP telephone terminal 1401 (See step S312 in FIG. 21) and the IP telephone terminal 1401 transmits a response notification to the IP telephone exchange 103c (See step S313 in FIG. 21). The IP telephone exchange 103c notifies the emergency communication terminal 102a that the call connection will be established (See step S314 in FIG. 21), while performing the holding device 106 with a process for disconnecting a call connection (See step S315 in FIG. 21). Accordingly, a conversation between the emergency communication terminal 102a and the IP telephone terminal 1401 can be realized.

Subsequently, the IP telephone exchange 103c transmits a setting change request to the subscriber information database 1405 (See step S401 in FIG. 21). When receiving the setting change request, the subscriber information database 1405 sets the connection state information of the subscriber information corresponding to the IP telephone terminal 1401 to "emergency call" (See step S402 in FIG. 21). Here, the subscriber information database 1405 does not delete the holding device specifying information. Then, subscriber information database 1405 transmits a request notification to the IP telephone exchange 103c (See step S318 in FIG. 21).

The IP telephone exchange 103c transmits a setting change request to the call processing database 1404c (See step S403 in FIG. 21). When receiving the setting change request, the call processing database 1404c sets the connection state information to "emergency call" (See step S404 in FIG. 21). Here, the call processing database 1404c does not delete the holding device specifying information. Then, the call processing database 1404c transmits a response notification to the IP telephone exchange 103c (See step S321 in FIG. 21).

The steps S403 to 321 may be performed earlier than the steps S401 to S318.

Subsequently, the IP telephone exchange 103c transmits a response notification to the IP telephone exchange 103a (See step S322 in FIG. 21) and the IP telephone exchange 103c transmits a setting change request to the call processing database 1404a (See step S405 in FIG. 21). When receiving the setting change request, the call processing database 1404a sets the connection state information to "emergency call"

(See step S406 in FIG. 21). Here, the call processing database 1404a does not delete the holding device specifying information. The call processing database 1404a transmits a response notification to the IP telephone exchange 103a (See step S325 in FIG. 21).

Finally, the completion of the callback process is notified from the IP telephone exchange 103a to the emergency communication terminal 102a (See step S326 in FIG. 21).

Figure 22:
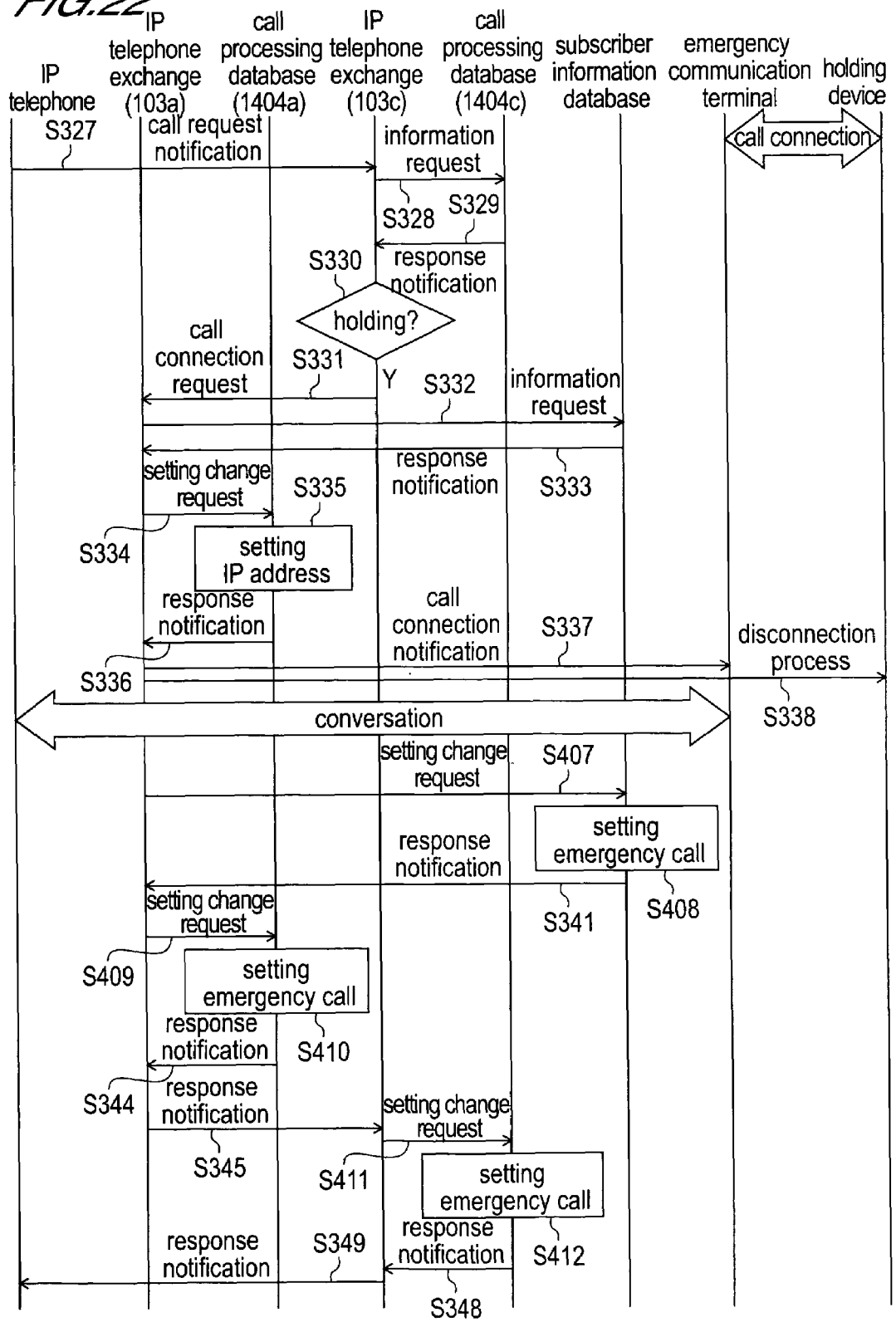

FIG. 22 is a schematic diagram showing an operation regarding a connection recovery function of the present invention. In FIG. 22, the processes of the steps referred by same step numbers as those of in FIG. 19 are the same process in the case of FIG. 19.

The procedures of the steps S327 to S338 are same as those in FIG. 19. After a call notification is transmitted from the IP telephone terminal 1401 to the IP telephone exchange 103c (See step S327 in FIG. 22), the IP telephone exchange 103c transmits an information request to the call processing database 1404c (See step S328 in FIG. 22), and the call processing database 1404c transmits a response notification including a holding exchange specifying information to the IP telephone exchange 103c (See step S329 in FIG. 22). When the connection state information is "holding" (See step S330 in FIG. 22), the IP telephone exchange 103c transmits a connection request to the IP telephone exchange 103a (See step S331 in FIG. 22). The IP telephone exchange 103a transmits an information request to the subscriber information database 1405 (See step S332 in FIG. 22), the subscriber information database 1405 transmits a response notification including the IP address to the IP telephone exchange 103a (See step S333 in FIG. 22), and the IP telephone exchange 103a rewrites the IP address of the call processing database 1404a (See steps S334, S335, and S336 in FIG. 22). Then, the IP telephone exchange 103a notifies the emergency communication terminal 102a that a call connection with the IP telephone terminal 1401 will be established and provides the holding device 106 with a process to disconnect the call connection (See steps S337 and S338 in FIG. 22). Accordingly, a conversation between the emergency communication terminal 102a and the IP telephone terminal 1401 can be realized.

Subsequently, the IP telephone exchange 103a transmits a setting change request to the subscriber information database 1405 (See step S407 in FIG. 22). When receiving the setting change request, the subscriber information database 1405 sets the connection state information to "emergency call" (See step S408 in FIG. 22). Here the subscriber information database 1405 does not delete the holding device information. Then the subscriber information database 1405 transmits a response notification to the IP telephone exchange 103a (See step S340 in FIG. 22).

The IP telephone exchange 103a transmits a setting change request to the call processing database 1404a (See step S409 in FIG. 22). When receiving the setting change request, the call processing database 1404a sets the connection state information to "emergency call" (See step S410 in FIG. 22). Here, the call processing database 1404a does not delete the holding device specifying information. Then, the call processing database 1404a transmits a response notification to the IP telephone exchange 103a (See step S343 in FIG. 22).

The steps S409 to S344 may be performed earlier than the steps S407 to S341.

Subsequently, the IP telephone exchange 103a transmits a response notification to the IP telephone exchange 103c (See step S344 in FIG. 22) and the IP telephone exchange 103c transmits a setting change request to the call processing database 1404c (See step S411 in FIG. 22). When receiving the setting change request, the call processing database 1404c sets the connection state information to "emergency call" (See step S412 in FIG. 22). Here, the call processing database 1404c does not delete the holding device specifying information. Then, the call processing database 1404c transmits a response notification to the IP telephone exchange 103c (See step S348 in FIG. 22).

The IP telephone exchange 103c transmits the response notification to the IP telephone terminal 1401 (See step S348 in FIG. 22). With this procedure, the connection recovery process is finished.

Figure 23:
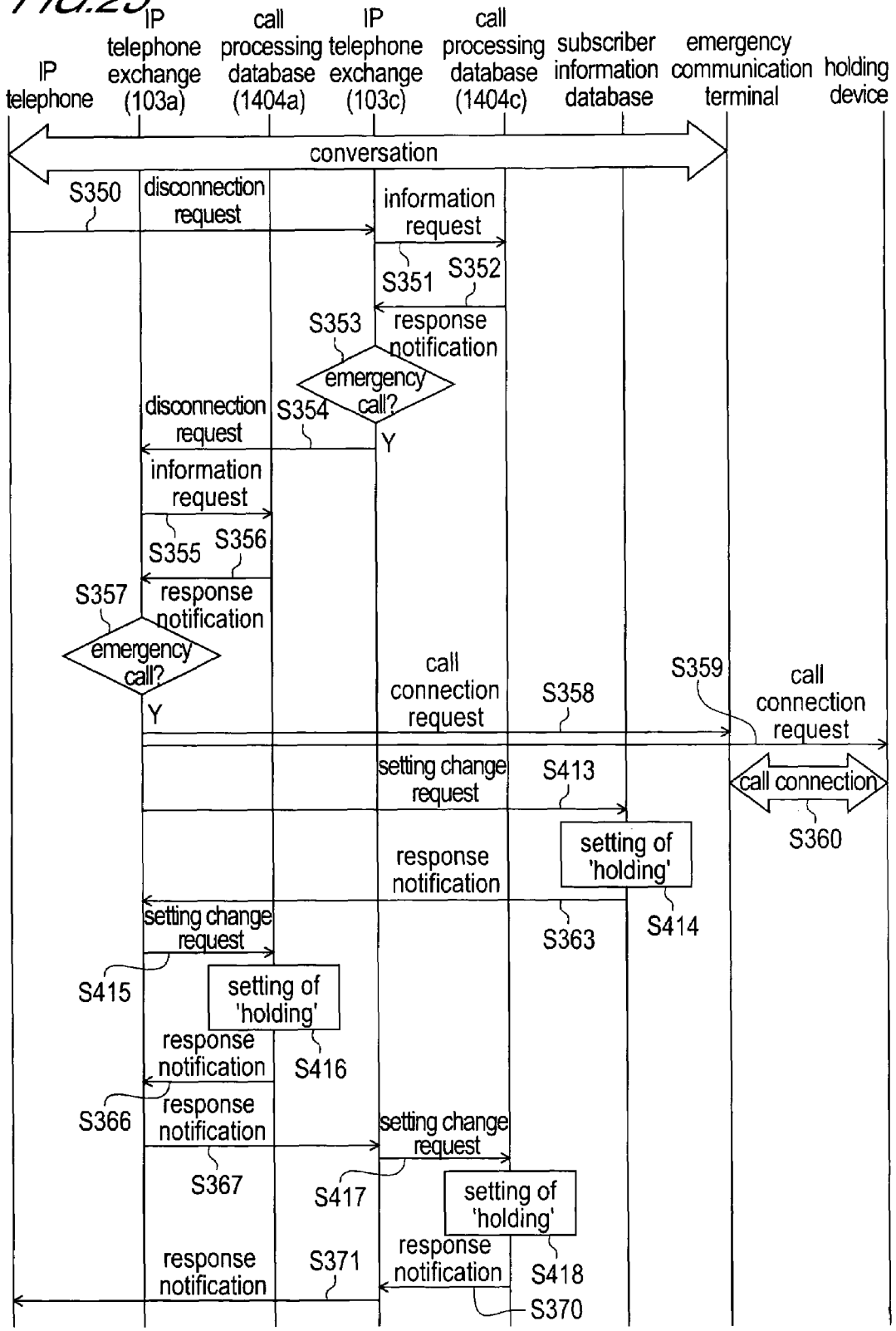

FIG. 23 is a schematic diagram showing sequence of an operation regarding a re-hold function of the present embodiment. In FIG. 23, the processes of the steps referred by same step numbers as those of in FIG. 20 are the same processes in the case of FIG. 20.

The processes of the steps S350 to S359 are same as those of the case in FIG. 20. The IP telephone terminal 1401 transmits a disconnection request to the IP telephone exchange 103c (See step S350 in FIG. 23), the IP telephone exchange 103c transmits an information request to the call processing database 1404c (See step S351 in FIG. 23), and the call processing database 1404c transmits a response notification including the connection state information to the IP telephone exchange 130c (See step S352 in FIG. 23). Further, when the connection state information is "emergency call" (See step S353 in FIG. 23), the IP telephone exchange 103c transmits a disconnection request to the IP telephone exchange 103a (See step S354 in FIG. 23), the IP telephone exchange 103a transmits an information request to the call processing database 1404a (See step S354 in FIG. 23), and the call processing database 1404a transmits a response notification including connection state information to the IP telephone exchange 103a (See step S356 in FIG. 23). When the connection state information is "emergency call" (See step S357 in FIG. 23), the IP telephone exchange 103a requests the emergency communication terminal 102a and the holding device 106 for a call connection (See steps S358 and S359 in FIG. 23). Accordingly, a call connection in a hold state is established between the emergency communication terminal 102a and the holding device 106 (See step S360 in FIG. 23).

Subsequently, the IP telephone exchange 103a transmits a setting change request to the subscriber information database 1405 (See step S413 in FIG. 23). When receiving the setting change request, the subscriber information database 1405 sets the connection state information to "emergency call" (See step S414 in FIG. 23). Here, the subscriber information database 1405 does not delete the holding device specifying information. Then, the subscriber information database 1405 transmits a response notification to the IP telephone exchange 103a (See step S363 in FIG. 23).

The IP telephone exchange 103a transmits a setting change request to the call processing database 1404a (See step S415 in FIG. 23). When receiving the setting change request, the call processing database 1404a sets the connection state information to "emergency call" (See step S416 in FIG. 23). Here, the call processing database 1404a does not delete the holding device specifying information. Then, the call processing database 1404a transmits a response notification to the IP telephone exchange 103a (See step S366 in FIG. 23).

The steps S415 to S366 may be performed earlier than the steps S413 to S363.

Subsequently, the IP telephone exchange 103a transmits a response notification to the IP telephone exchange 103c (See step S367 in FIG. 23), and the IP telephone exchange 103c transmits a setting change request to the 1404 (See step S417 in FIG. 23). When receiving the setting change request, the call processing database 1404c sets the connection state information to "emergency call" (See step S418 in FIG. 23). Here, the call processing database 1404c does not delete the holding exchange specifying information. Then, the call processing database 1404c transmits a response notification to the IP telephone exchange 103c (See step S370 in FIG. 23).

Then, the IP telephone exchange 103c transmits a response notification to the IP telephone terminal 1401 (See step S371 in FIG. 23). Accordingly, the IP telephone terminal 1401 is put in a hold state.

According to the system of the present embodiment, a resource for holding is reserved when an emergency call connection is established, so the assurance of the holding process is improved.

Fifth Embodiment

Figure 26:
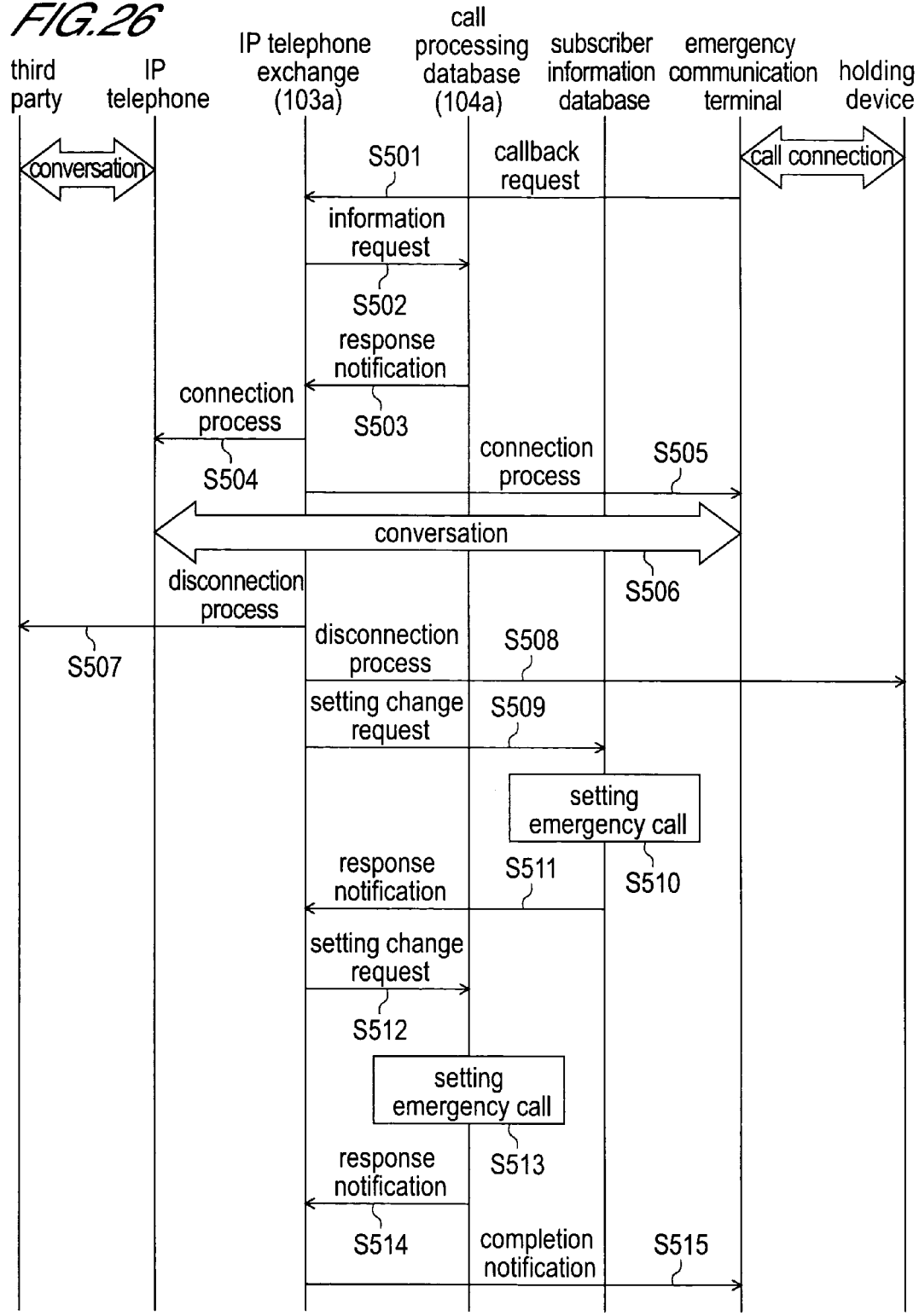
FIG. 26 is a schematic diagram showing sequence of an operation of an IP telephone system according to the fifth embodiment.

A fifth embodiment of the present invention will be describe with reference to FIGS. 24 to 26.

A system structure of an IP telephone system according to the present embodiment is same as the system 100 according to the first embodiment. In the present embodiment, an IP telephone terminal which disconnects an emergency call connection is allowed to connect a call connection with a telephone terminal of a third party while the emergency call connection is in a hold state. That is, the system of the present embodiment does not have an call block function and a connection recovery function. However, in the system of the present embodiment, while a call connection is established between the IP telephone terminal in a hold state and the telephone terminal of the third party, an emergency communication terminal 102a can interrupt forcibly.

FIG. 24 is a schematic diagram showing a structure of data stored in a subscriber information database according to the present embodiment. As shown in FIG. 24, the structure of data stored in the subscriber information database of the present embodiment is different from that of the first embodiment on the point that third party specifying information is included.

FIG. 25 is a schematic diagram showing a structure of data stored in a call processing database according to the present embodiment. As shown in FIG. 25, the structure of data stored in the call processing database of the present embodiment is different from that of the first embodiment on the point that third party specifying information is included.

As a case where a call connection is established between an IP telephone terminal in a hold state and a telephone terminal of a third party, there are a call request from the IP telephone terminal in a hold state to the telephone terminal of the third party and a call request from the telephone terminal of the third party to the IP telephone terminal in a hold state.

A call request from the telephone terminal of the third party to the IP telephone terminal will be explained with reference to FIG. 1.

When a call request is sent from the telephone terminal of the third party to the IP telephone terminal 101, the IP telephone exchange 103a transmits an information request to the call processing database 104a. When receiving the information request, the call processing database 104a takes connection state information from registered subscriber information corresponding to the telephone number. Then, the call processing database 104a transmits a response notification including the connection state information to the IP telephone exchange 103a. The IP telephone exchange 103a takes the connection state information from the received response notification. Then, when the connection state information is "holding", a call connection between the IP telephone terminal 101 and the telephone terminal of the third party is established after the IP telephone exchange 103a makes the call processing database 104a and the subscriber information database 105 to write the third party specifying information.

FIG. 26 is a schematic diagram showing sequence of an operation regarding an interruption function.

Firstly, a callback request is transmitted from the emergency communication terminal 102a to the IP telephone exchange 103a (See step S501 in FIG. 26).

When receiving the callback request, the IP telephone exchange 103a transmits an information request to the call processing database 104a (See step S502 in FIG. 26). In the information request, the telephone number of the IP telephone terminal 101 is included.

When receiving the information request, the call processing database 104a takes connection state formation, holding device specifying information, and third party specifying information from the registered subscriber information corresponding to the telephone number of the IP telephone terminal 101. When a call connection with the third party is established during hold state, the connection state information indicates "holding" and the telephone number of the third party is stored in the third party specifying information. The call processing database 104a transmits a response notification including the information to the IP telephone exchange 103a (See step S503 in FIG. 26).

The IP telephone exchange 103a checks the received response notification. When the connection state information is "holding", the IP telephone exchange 103a performs a call connection process to the IP telephone terminal 101 and the emergency communication terminal 102a (See steps S504 and S505 in FIG. 26). Accordingly, a call connection between the IP telephone terminal 101 and the emergency communication terminal 102a is established (See step S506 in FIG. 26).

Next, the IP telephone exchange 103a provides a holding device with process to disconnect a call connection with the telephone terminal of the third party (See steps S507 and S508 in FIG. 26).

Subsequently, the IP telephone exchange 103a transmits a setting change request to the subscriber information database 105 (See step S509 in FIG. 26). When receiving the setting change request, the subscriber information database 105 sets the connection state information of the subscriber information corresponding to the IP telephone terminal 101 to "emergency call" and deletes the holding device specifying information and the third party specifying information (See step S510 in FIG. 26). Then, the subscriber information database 105 transmits a response notification to the IP telephone exchange 103a (See step S511 in FIG. 26).

Next, the IP telephone exchange 103a transmits a setting change request to the call processing database 104a (See step S512 in FIG. 26). When receiving the setting change request, the call processing database 104a sets the connection of the registered subscriber information corresponding to the IP telephone terminal 101 to "emergency call" and deletes the holding device specifying information and the third party specifying information (See step S513 in FIG. 26). Then, the call processing database 104a transmits a response notification to the IP telephone exchange 103a (See step S514 in FIG. 26).

The steps S512 to S514 may be performed earlier than the steps S509 to S511.

Finally, the completion of the callback process is notified to the emergency communication terminal 102a (See step S515 in FIG. 26).

In the present embodiment, the emergency communication terminal 102a can interrupt the call connection between the IP telephone terminal in a hold state and the telephone terminal of the third party. Therefore, even though a call connection between the IP telephone terminal in a hold state and the telephone terminal of the third party is allowed, a call connection between the emergency communication terminal 102a and the IP telephone terminal may be established at any time.

The number of the subscriber information database 105 is not required to be one and a plurality of distributed storages may constitute a single database.

The call processing database may be provided to the embedded memory of an IP telephone exchange or may be provided as an external storage.

The subscriber information database and the call processing database may be provided in a single storage.

As a protocol for providing an IP address to an IP telephone terminal, DHCP (Dynamic Host Configuration Protocol) or PPP (Point to Point Protocol) may be used.

As an IP telephone terminal, an analog telephone sets connected to an adapter for IP telephone, a personal computer to which an application software for IP telephone is installed, or a PDA (Personal Digital Assistance) having a function as a IP telephone sets may be used.

In stead of the above SIP, other protocols such as MGCP (Media Gateway Control Protocol) may be used as a protocol for a call connection.

In the first to fifth embodiments, a subscriber is specified in use of its telephone number and IP address; however, for example, SIP-URI (Session Initiation Protocol-Uniform Resource Identifier) may be used in stead of them.

What is claimed is:

1. An IP telephone system, comprising:
   a first IP telephone exchange which manages a first IP telephone terminal;
   a second IP telephone exchange which manages a second IP telephone terminal; and
   a holding device which is call-connected with the second IP telephone terminal when the first IP telephone terminal holds a call connection with the second IP telephone terminal and call disconnected with the second IP telephone terminal when the call between the first and second terminals returned from hold state to connection state
   a call processing database which stores a telephone number, an IP address and connection state information at least for each of the IP telephone terminals;
   a subscriber information database which stores a telephone number, an IP address and connection state information at least for each of the IP telephone terminals;
   wherein,
   when the first IP telephone exchange receives an emergency call notification, the first IP telephone exchange transmits a setting change request to the call processing database and the subscriber information database, the call processing database change the connection state information to "emergency call", and the subscriber information database change the connection state information to "emergency call".

2. An IP telephone system according to claim 1, wherein the second IP telephone terminal is an emergency communication terminal which receives an emergency call from the first IP telephone terminal.

3. An IP telephone system according to claim 1, wherein, when the first IP telephone terminal goes into an on-hook state during the call connection, the first IP telephone exchange switches the call connection between the first IP telephone terminal and the second IP telephone terminal to a call connection between the holding device and the second IP telephone terminal.

4. An IP telephone system according to claim 1, wherein the call processing database stores information specifying the holding device used for the holding of the first IP telephone terminal among a plurality of holding devices.

5. An IP telephone system according to claim 1, wherein the call processing database is provided to each of the IP telephone exchanges.

6. An IP telephone system according to claim 1, wherein the subscriber information database stores information specifying the holding device used for the holding of the IP telephone terminal among a plurality of holding devices.

7. An IP telephone system according to claim 1, wherein the first IP telephone exchange blocks a call to the first IP telephone terminal from another telephone terminal when the call connection between the first IP telephone terminal and the second IP telephone terminal is in a hold state.

8. An IP telephone system according to claim 1, wherein, when receiving a callback request from the second IP telephone terminal, the first IP telephone exchange switches a call connection between the holding device and the second IP telephone terminal to a call connection between the first IP telephone terminal and the second IP telephone terminal.

9. An IP telephone system according to claim 1, wherein, when receiving a call request notification of the first IP telephone terminal to another telephone terminal, the first IP telephone exchange switches the call connection between the holding device and the second IP telephone terminal to a call connection between the first IP telephone terminal and the second IP telephone terminal.

10. An IP telephone system according to claim 1, wherein, when receiving a call request notification regarding the call connection from the first IP telephone terminal, the first IP telephone exchange reserves a resource in the holding device and establishes a call connection to the second IP telephone terminal.

11. An IP telephone system according to claim 10, wherein, when receiving a call request notification regarding a call from the first IP telephone terminal, the first IP telephone exchange selects the holding device from a plurality of the holding devices and reserves a resource in the selected holding device.

12. An IP telephone system according to claim 1, further comprising a third IP telephone exchange which manages the first IP telephone terminal which is moved when a call connection between the first IP telephone terminal and the second IP telephone terminal is in a hold state.

13. An IP telephone system according to claim 1, wherein, when a call connection between the first IP telephone terminal and the second IP telephone terminal is in a hold state, a call connection between the first IP telephone terminal and another telephone terminal is established, and a callback request from the second IP telephone terminal is received, the first IP telephone exchange disconnects the call connection between the first IP telephone terminal and said another telephone terminal forcibly and switches a call connection between the holding device and the second IP telephone terminal to a call connection between the first IP telephone terminal and the second IP telephone terminal.

14. An IP telephone system according to claim 1, wherein, when the first IP telephone terminal goes into an on-hook state during the call connection, the first IP telephone exchange switches the call connection between the first IP telephone terminal and the second IP telephone terminal to a call connection between the holding device and the second IP telephone terminal, the first IP telephone exchange transmits a setting change request to the call processing database and the subscriber information database, the call processing database change the connection state information to "holding", and the subscriber information database change the connection state information to "holding".

15. An IP telephone system according to claim 14, wherein, when there is a call request for the first IP telephone terminal which is in a hold state, the first IP telephone exchange transmits an information request,
  in the case that connection state information is "holding", the first IP telephone exchange blocks the call to the first IP telephone terminal from said another telephone terminal.

16. An IP telephone system according to claim 14, wherein, when there is a callback request from the second IP telephone terminal for the first IP telephone terminal which is in a hold state, the first IP telephone exchange transmits a information request to the call processing database,
  in the case that connection state information is "holding", the first IP telephone exchange switches a call connection between the holding device and the second IP telephone terminal to a call connection between the first IP telephone terminal and the second IP telephone terminal.

17. An IP telephone system according to claim 14, wherein, when there is a call request notification of the first IP telephone terminal to another telephone terminal for the first IP telephone terminal which is in a hold state, the first IP telephone exchange transmits a information request to the call processing database,
  in the case that connection state information is "holding", the first IP telephone exchange switches the call connection between the holding device and the second IP telephone terminal to a call connection between the first IP telephone terminal and the second IP telephone terminal.

18. An IP telephone system according to claim 14, wherein, when a call connection between the first IP telephone terminal and the second IP terminal is in a hold state, a call connection between the first IP telephone terminal and another telephone terminal is established, and a callback request from the second IP telephone terminal is received, the first IP telephone exchange transmits a information request to the call processing database,
  in the case that connection state information is "holding", the first IP telephone exchange disconnects the call connection between the first IP telephone terminal and said another telephone terminal forcibly and switches a call connection between the holding device and the second IP telephone terminal to a call connection between the first IP telephone terminal and the second IP telephone terminal.

19. An IP telephone system according to claim 18, wherein, third party specifying information is included in the subscriber information database.

20. An IP telephone system according to claim 18, wherein, third party specifying information is included in the call processing database.

* * * * *